US009862345B2

(12) United States Patent
Ohno

(10) Patent No.: US 9,862,345 B2
(45) Date of Patent: Jan. 9, 2018

(54) SIDE AIRBAG DEVICE-INSTALLED VEHICLE SEAT

(71) Applicant: Toyota Jidosha Kabushiki Kaisha, Toyota-shi Aichi-ken (JP)

(72) Inventor: Mitsuyoshi Ohno, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/365,130

(22) Filed: Nov. 30, 2016

(65) Prior Publication Data

US 2017/0225640 A1 Aug. 10, 2017

(30) Foreign Application Priority Data

Feb. 10, 2016 (JP) ................................. 2016-023944

(51) Int. Cl.
*B60R 21/207* (2006.01)
*B60R 21/233* (2006.01)
*B60R 21/2338* (2011.01)
*B60R 21/237* (2006.01)
*B60R 21/239* (2006.01)
(Continued)

(52) U.S. Cl.
CPC .......... *B60R 21/207* (2013.01); *B60R 21/233* (2013.01); *B60R 21/237* (2013.01); *B60R 21/239* (2013.01); *B60R 21/2338* (2013.01); *B60R 21/264* (2013.01); *B60R 21/276* (2013.01); *B60R 2021/0006* (2013.01); *B60R 2021/23146* (2013.01);
(Continued)

(58) Field of Classification Search
CPC ... B60R 21/207; B60R 21/233; B60R 21/239; B60R 21/23138; B60R 2021/23146
See application file for complete search history.

(56) References Cited

U.S. PATENT DOCUMENTS 5,899,490 A 5/1999 Wipasuramonton et al.
6,270,113 B1 8/2001 Wipasuramonton et al.
(Continued)

FOREIGN PATENT DOCUMENTS

JP 2009-023494 A 2/2009
JP 2010-208434 A 9/2010
(Continued)

OTHER PUBLICATIONS

Non-Final Office Action dated Sep. 25, 2017 in U.S. Appl. No. 15/350,735.

*Primary Examiner* — Faye M Fleming
(74) *Attorney, Agent, or Firm* — Dinsmore & Shohl LLP

(57) ABSTRACT

A side airbag device-installed vehicle seat including: an inner bag section that extends out from a side airbag main body, past a seat front of a side frame, and to a seat width direction inner side of the side frame, and that inflates within a side section of a seatback when an internal portion of the inner bag section in communication with an inside of the side airbag main body is supplied with gas from a gas generator; and a reaction force member including a fixing portion that is fixed to the side frame, and a reaction force application portion that is interposed between the inner bag section and the side frame at the seat width direction inner side of the side frame and that applies reaction force to the inner bag section during inflation, the inner bag section being anchored to the reaction force application portion.

14 Claims, 12 Drawing Sheets

(51) Int. Cl.
    *B60R 21/264*     (2006.01)
    *B60R 21/276*     (2006.01)
    *B60R 21/00*     (2006.01)
    *B60R 21/231*     (2011.01)
    *B60R 21/235*     (2006.01)

(52) U.S. Cl.
    CPC ........... *B60R 2021/23316* (2013.01); *B60R 2021/23382* (2013.01); *B60R 2021/23509* (2013.01); *B60Y 2306/01* (2013.01)

(56) References Cited

U.S. PATENT DOCUMENTS

| | | | |
|---|---|---|---|
| 6,364,348 | B1 | 4/2002 | Jang et al. |
| 8,528,934 | B2 | 9/2013 | Kobayshi et al. |
| 8,602,449 | B2 | 12/2013 | Kojima |
| 8,702,123 | B2 | 4/2014 | Mazanek et al. |
| 9,056,591 | B2 | 6/2015 | Fujiwara |
| 9,290,151 | B2 | 3/2016 | Fujiwara |
| 9,358,909 | B2* | 6/2016 | Jeong .................. B60N 2/4415 |
| 9,434,341 | B2* | 9/2016 | Kaneko .................. B60N 2/449 |
| 9,616,791 | B2 | 4/2017 | Awata et al. |
| 2009/0020988 | A1 | 1/2009 | Sato et al. |
| 2015/0151711 | A1 | 6/2015 | Fujiwara |
| 2015/0158453 | A1 | 6/2015 | Fujiwara |
| 2015/0197212 | A1 | 7/2015 | Fujiwara |
| 2015/0367804 | A1 | 12/2015 | Fujiwara |
| 2017/0036634 | A1* | 2/2017 | Ohno .................... B60R 21/013 |
| 2017/0174174 | A1* | 6/2017 | Ohno .................... B60R 21/239 |
| 2017/0182969 | A1* | 6/2017 | Fujiwara ........... B60R 21/23138 |

FOREIGN PATENT DOCUMENTS

| | | |
|---|---|---|
| JP | 2014-080169 A | 5/2014 |
| WO | 2014/013822 A1 | 1/2014 |

\* cited by examiner

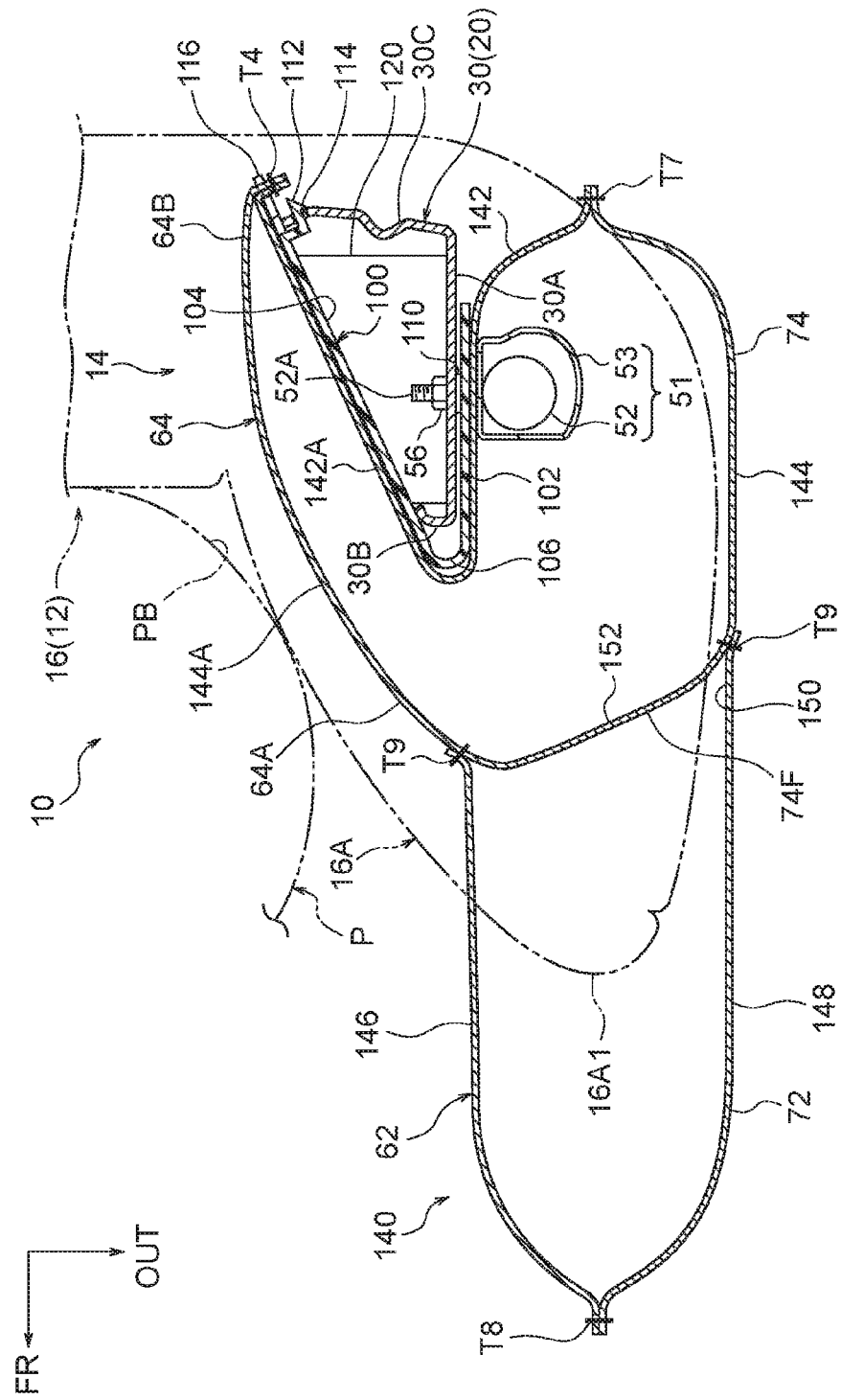

SIDE AIRBAG DEVICE-INSTALLED VEHICLE SEAT

CROSS-REFERENCE TO RELATED APPLICATION

This application is based on and claims priority under 35 USC 119 from Japanese Patent Application No. 2016-023944 filed on Feb. 10, 2016, the disclosure of which is incorporated by reference herein.

BACKGROUND

Technical Field

The present disclosure relates to a side airbag device-installed vehicle seat.

Related Art

Japanese Patent Application Laid-Open (JP-A) No. 2009-023494 describes a side airbag device including a main airbag and an auxiliary airbag. The main airbag is folded up in a concertina shape at a seat front side and seat width direction outer side of an outer side frame provided to a seat frame of a seatback. The auxiliary airbag is folded up in a concertina shape at the seat width direction inner side of the outer side frame. A base end portion of the auxiliary airbag passes the seat front of the outer side frame, wraps around to the seat width direction outer side of the outer side frame, and is joined to a base end portion of the main airbag. An inflator is housed in a base end portion of the auxiliary airbag, and the base end portion of the auxiliary airbag is fastened and fixed to the outer side frame using stud bolts of the inflator. The auxiliary airbag inflates and deploys within the side section of the seatback ahead of the main airbag, and moves the occupant toward the seat width direction inner side, thereby widening a vehicle width direction space between the occupant and the body side section. This facilitates inflation and deployment of the main airbag between the occupant and the body side section.

During manufacture of a side airbag device-installed vehicle seat, sometimes a seat pad is covered over (assembled to) a seat frame after attaching an airbag and an inflator to the seat frame. Regarding this point, with a side airbag device configured as described above, there is a possibility that during assembly of such a seat pad, the seat pad could impinge on the auxiliary airbag, causing the auxiliary airbag to be displaced from its correct attachment position. There is therefore a possibility that preventing such positional displacement in an assembly operation of the seat pad could become complex and frustrating.

In the side airbag device configured as described above, there is a possibility of part of the auxiliary airbag escaping to the outer side frame side (opposite side to the occupant) during occupant restraint by the auxiliary airbag, lowering the occupant restraint performance of the auxiliary airbag.

SUMMARY

In consideration of the above circumstances, an object of the present disclosure is to obtain a side airbag device-installed vehicle seat configured including a side airbag main body that inflates and deploys at a seat front side of a side section of a seatback, and an inner bag section that inflates within the side section described above, and that is capable of both improving occupant restraint performance of the inner bag section and improving the ease of assembly of a seat pad to a seat frame.

A side airbag device-installed vehicle seat of a first aspect of the present disclosure includes: a side airbag device-installed vehicle seat comprising: a seat frame that is configured including a side frame provided inside a side section of a seatback, and that is covered by a seat pad; a side airbag main body that is stored inside the side section at a seat width direction outer side of the side frame, that is fixed to the side frame using a gas generator housed inside the side airbag main body, and that receives a supply of gas from the gas generator and inflates and deploys toward a seat front side of the side section; an inner bag section that extends out from the side airbag main body, past a seat front of the side frame, and to a seat width direction inner side of the side frame, and that inflates within the side section when an internal portion of the inner bag section in communication with an inside of the side airbag main body is supplied with gas from the gas generator; and a reaction force member including a fixing portion that is fixed to the side frame, and a reaction force application portion that is interposed between the inner bag section and the side frame at the seat width direction inner side of the side frame and that applies reaction force to the inner bag section during inflation, the inner bag section being anchored to the reaction force application portion.

The first aspect of the present disclosure includes the side airbag main body and the inner bag section. The side airbag main body is stored inside the side section of the seatback, at the seat width direction outer side of the side frame. The inner bag section extends out from the side airbag main body, past the seat front of the side frame, and to the seat width direction inner side of the side frame. An internal portion of the inner bag section is in communication with the inside of the side airbag main body. The side airbag main body is fixed to the side frame using the internally housed gas generator. The gas generator is set off when, for example, a side-on collision of the vehicle has been detected. Accordingly, the side airbag main body receives a supply of gas from the gas generator and inflates and deploys toward the seat front side of the side section. A portion of the gas supplied into the side airbag main body is supplied into the inner bag section, and the inner bag section inflates within the side section.

Note that the reaction force application portion of the reaction force member is interposed between the inner bag section and the side frame at the seat width direction inner side of the side frame. The reaction force member includes the fixing portion fixed to the side frame, and the reaction force application portion that applies a reaction force to the inner bag section during inflation. This thereby enables the inner bag section to be prevented or suppressed from escaping to the side frame side during occupant restraint. Occupant restraint performance of the inner bag section can accordingly be improved. Moreover, the inner bag section is anchored to the reaction force application portion. This thereby enables positional displacement of the inner bag section when covering (assembling) the seat frame with the seat pad to be prevented or suppressed. The ease of assembly of the seat pad to the seat frame can accordingly be improved.

A side airbag device-installed vehicle seat of a second aspect of the present disclosure is the first aspect, wherein: the fixing portion is disposed at the seat width direction outer side of the side frame, and is fixed to the side frame using the gas generator.

In the second aspect of the present disclosure, the fixing portion of the reaction force member is disposed at the seat width direction outer side of the side frame, together with the side airbag main body, and is fixed to the side frame using the gas generator, together with the side airbag main body. Such a configuration enables, for example, the side airbag main body from which the inner bag section extends out, and the fixing portion of the reaction force member, to be temporarily fixed using the gas generator during a manufacturing stage of the side airbag device, and enables the respective configuration elements above to be configured as a module. Ease of operation, for example during attachment of the respective configuration elements above to the side frame, is thereby improved.

A side airbag device-installed vehicle seat of a third aspect of the present disclosure is the second aspect, wherein: the fixing portion and the reaction force application portion are coupled together at the seat front side of the side frame.

According to the third aspect of the present disclosure, in the reaction force member, the fixing portion disposed at the seat width direction outer side of the side frame, and the reaction force application portion interposed between the inner bag section and the side frame at the seat width direction inner side the side frame, are coupled together at the seat front side of the side frame. Namely, the reaction force application portion extends from the seat front side of the side frame to the seat width direction inner side of the side frame, similarly to the inner bag section. This thereby enables the extension length of the reaction force application portion to bet set shorter than in configurations in which, for example, the reaction force application portion extends from the seat rear side of the side frame to the seat width direction inner side of the side frame.

A side airbag device-installed vehicle seat of a fourth aspect of the present disclosure is the first aspect, wherein: the reaction force application portion is inclined toward the seat width direction inner side on progression toward a seat rear side.

In the fourth aspect of the present disclosure, the reaction force application portion of the reaction force member is inclined in the manner described above. Note that a location at the back side of a side face of the upper body of an occupant leaning against the seatback curves toward the seat width direction inner side on progression toward the seat rear side. Namely, the reaction force application portion is inclined so as to follow this back side location. This facilitates inflation of the inner bag section toward the back side location when the inner bag section receives a reaction force from the reaction force application portion and inflates, thereby enabling good restraint of the back side location by the inner bag section.

A side airbag device-installed vehicle seat of a fifth aspect of the present disclosure is the first aspect, wherein: the fixing portion and the reaction force application portion are coupled together through an integral hinge, and an end portion of the reaction force application portion on an opposite side from the integral hinge is anchored to the side frame.

According to the fifth aspect of the present disclosure, during attachment of the reaction force application portion to the side frame, for example, the reaction force application portion is rotated about the integral hinge with respect to the fixing portion after the fixing portion has been fixed to the side frame. The end portion of the reaction force application portion on the opposite side to the integral hinge is then anchored to the side frame. This thereby enables the reaction force application portion to be prevented from getting in the way when the fixing portion is being fixed to the side frame, for example.

A side airbag device-installed vehicle seat of a sixth aspect of the present disclosure is the first aspect, wherein: the reaction force member includes a main body reaction force application portion that is disposed at a seat rear of the side airbag main body and that applies reaction force to the side airbag main body during inflation and deployment.

In the sixth aspect of the present disclosure, the reaction force member including the reaction force application portion for the inner bag section also includes the main body reaction force application portion that applies reaction force to the side airbag main body during inflation and deployment. This thereby enables deployment performance of the side airbag main body to also be improved with a simple configuration.

As described above, the side airbag device-installed vehicle seat according to the present disclosure is configured including the side airbag main body that inflates and deploys at the seat front side of the side section of the seatback, and the inner bag section that inflates within the side section, and is capable of both improving occupant restraint performance of the inner bag section and improving the ease of assembly of the seat pad to the seat frame.

BRIEF DESCRIPTION OF THE DRAWINGS

Exemplary embodiments of the present disclosure will be described in detail based on the following figures, wherein:

FIG. 12 is a cross-section corresponding to FIG. 2, illustrating configuration of relevant portions of a side airbag device-installed vehicle seat according to a fourth exemplary embodiment of the present disclosure.

DETAILED DESCRIPTION

First Exemplary Embodiment

Figure 1:
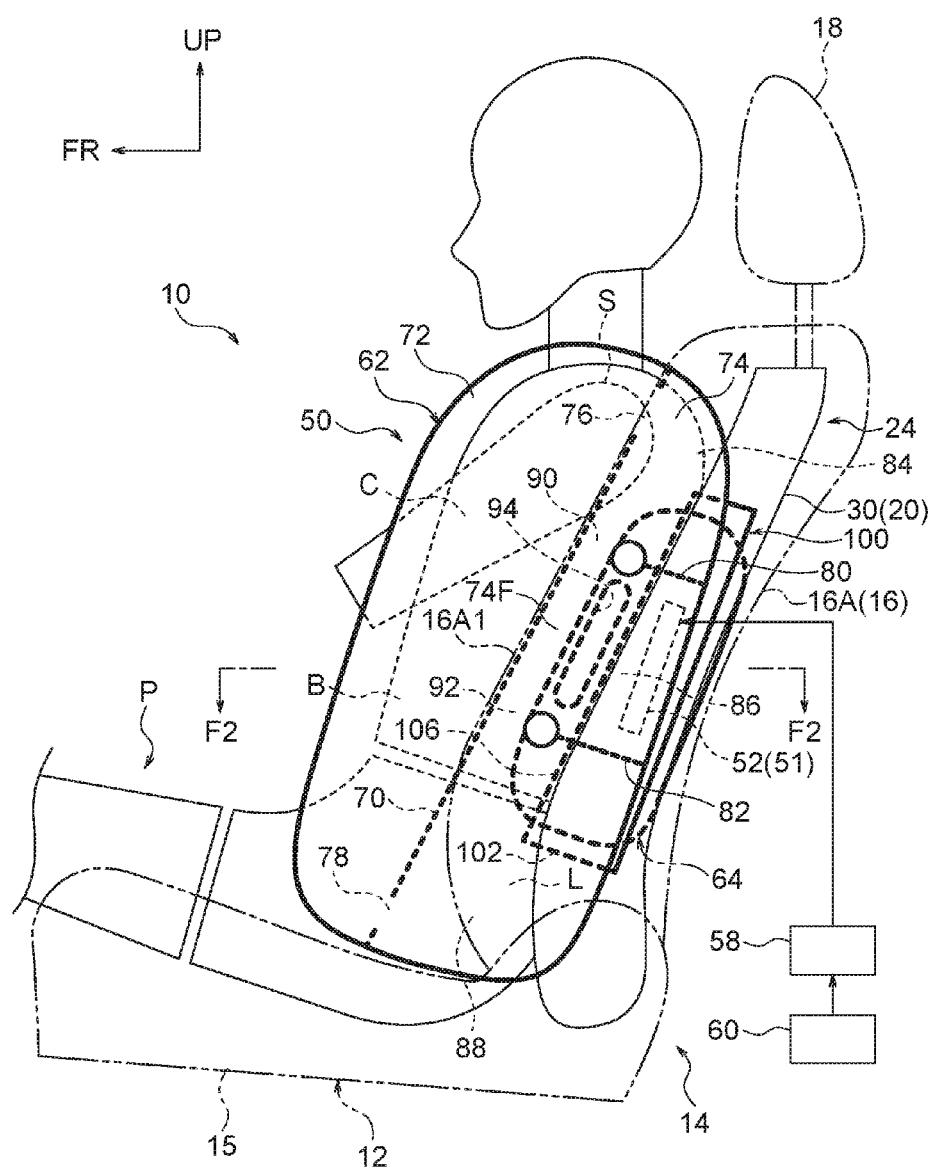
FIG. 1 is a side view of a side airbag device-installed vehicle seat according to a first exemplary embodiment of the present disclosure, illustrating a state in which a side airbag main body has inflated and deployed and an inner bag section has inflated.

Explanation follows regarding a side airbag device-installed vehicle seat 10 (abbreviated to "vehicle seat 10" below) according to an exemplary embodiment of the present disclosure, with reference to FIG. 1 to FIG. 8. In each of the drawings, the arrow FR, the arrow UP, and the arrow OUT respectively indicate a front direction (direction of travel) of the vehicle, an upward direction of the vehicle, and a vehicle width direction outside, as appropriate. In the following explanation, unless specifically stated otherwise, explanation referring simply to the front and rear, left and right, and up-down directions refers to the front and rear in a vehicle front-rear direction, the left and right in a vehicle left-right direction (vehicle width direction), and up and down in a vehicle up-down direction. Some reference numerals may be omitted in the respective drawings.

Configuration

As illustrated in FIG. 1, the vehicle seat 10 of the present exemplary embodiment is configured by a seat body 12 and a side airbag device 14. Detailed explanation follows regarding respective configuration elements thereof.

Seat Body 12 Configuration

The seat body 12 includes a seat cushion 15 on which an occupant P sits, a seatback 16 that is coupled to a rear end portion of the seat cushion 15 and that supports the back of the occupant P, and a headrest 18 that is coupled to an upper end portion of the seatback 16 and that supports the head of the occupant P.

Note that in the present exemplary embodiment, the front-rear direction, the left-right direction (width direction) and the up-down direction of the seat body 12 and the seatback 16 correspond to the front-rear direction, the left-right direction (width direction), and the up-down direction of the vehicle. FIG. 1 illustrates a crash test dummy P seated in the seat body 12 in the place of an actual occupant. The dummy P is, for example, a World Side Impact Dummy (WorldSID) of a $50^{th}$ percentile American adult male (AM50). In order to facilitate understanding, the following explanation refers to the dummy P as the "occupant P".

Figure 2:
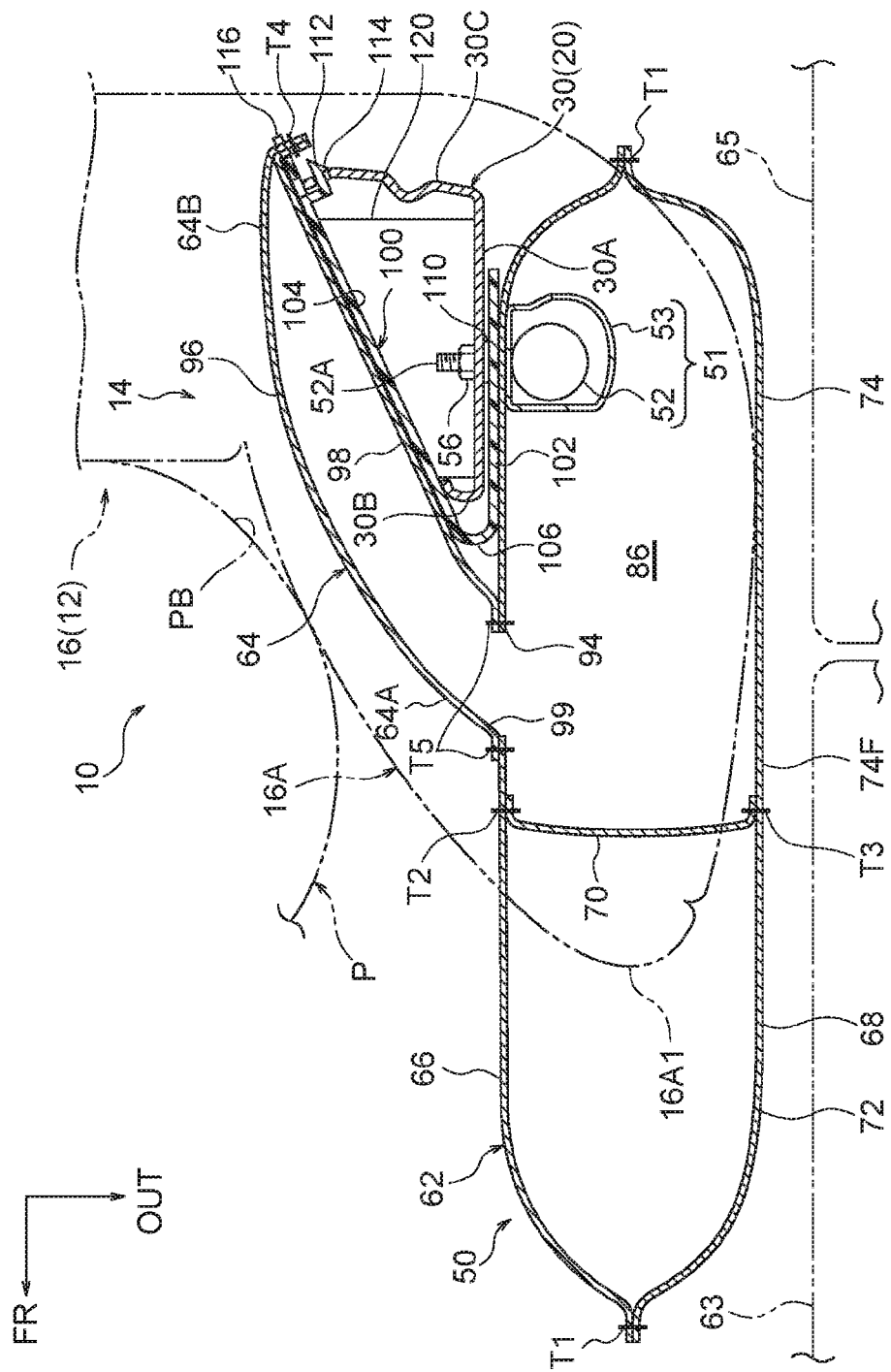
FIG. 2 is a cross-section view illustrating relevant portions in close-up in a cross-section taken along line F2-F2 in FIG. 1.
Figure 3:
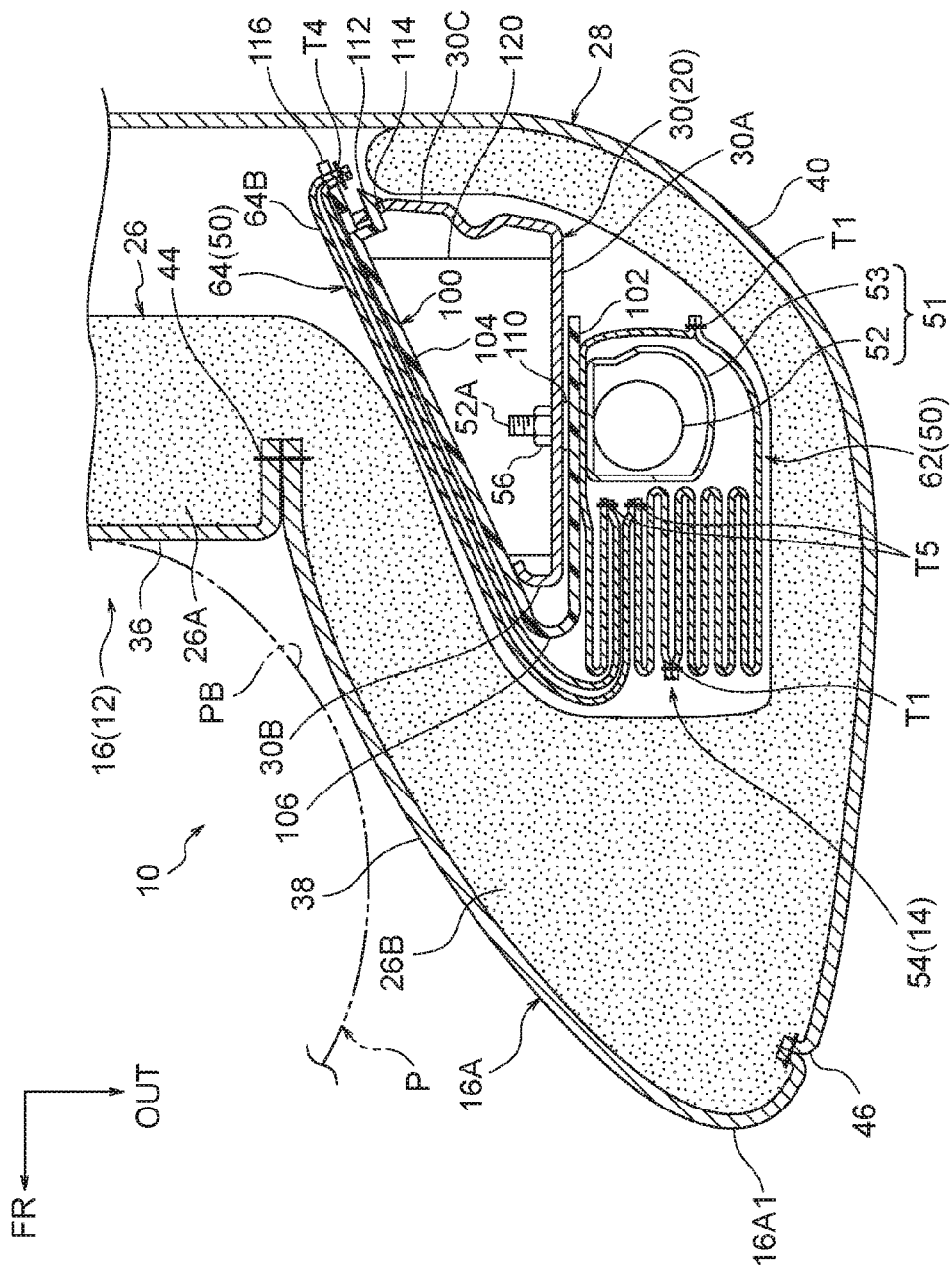
FIG. 3 is a cross-section corresponding to FIG. 2, illustrating a stored state of a side airbag main body and an inner bag section.

As illustrated in FIG. 1 to FIG. 3, the seatback 16 includes a metal seatback frame 20, this being a framework member, a seatback pad 26, this being a cushion member covering the seatback frame 20 (see FIG. 3; omitted from illustration with the exception of in FIG. 3), and a seat cover 28 that covers the seatback pad 26 (see FIG. 3; omitted from illustration with the exception of in FIG. 3). The seatback frame 20 corresponds to a "seat frame" according to the present disclosure, and the seatback pad 26 corresponds to a "seat pad" according to the present disclosure.

The seatback frame 20 includes an outer side frame 30 provided inside a side section 16A on the vehicle width direction outside of the seatback 16, and an inner side frame provided inside a side section (neither of which are illustrated in the drawings) on the vehicle width direction inside of the seatback 16. The seatback frame 20 includes an upper frame, not illustrated in the drawings, connecting upper end portions of the outer side frame 30 and the inner side frame together, and a lower frame, not illustrated in the drawings, connecting lower end portions of the outer side frame 30 and the inner side frame together along the seat width direction. The outer side frame 30 corresponds to a "side frame" of the present disclosure.

As illustrated in FIG. 2 and FIG. 3, the outer side frame 30 includes a side wall portion 30A, a front flange portion 30B, and a rear flange portion 30C. In plan view cross-section of the seatback 16, the outer side frame 30 has a substantially U-shaped cross-section opening toward the seat width direction inner side. The side wall portion 30A extends along the seat front-rear direction in plan view cross-section of the seatback 16. The front flange portion 30B extends from a front end of the side wall portion 30A toward the seat width direction inner side, and a leading end portion of the front flange portion 30B is bent obliquely toward the seat rear side. The rear flange portion 30C extends from a rear end of the side wall portion 30A toward the seat width direction inner side, and a leading end portion of the rear flange portion 30C is bent obliquely toward the seat front side. The rear flange portion 30C is set with a larger seat width direction dimension than the front flange portion 30B, and extends further toward the seat width direction inner side than the front flange portion 30B. Note that the inner side frame is configured similarly to the outer side frame 30, but with left-right symmetry thereto.

The seatback pad 26 illustrated in FIG. 3 is formed from a foamed body such as a urethane foam, and is configured by a pad central section 26A and a pair of left and right pad side sections 26B (the pad side section 26B on the vehicle width direction inside is not illustrated in the drawings). The pad central section 26A is disposed at a width direction central side of the seatback 16, and is supported from the seat rear side by seatback springs, not illustrated in the drawings. The left and right pad side sections 26B are each formed with a substantially C-shaped horizontal cross-section profile, and internally house the outer side frame 30 and the inner side frame respectively. The pad side sections 26B protrude out further toward the seat front side than the pad central section 26A, and are shaped so as to secure side support performance with respect to the occupant P.

The seat cover 28 illustrated in FIG. 3 includes a front cover 36 covering the pad central section 26A from the seat front side, front side covers 38 covering the pad side sections 26B from the seat front side, and a rear side cover 40 covering the pad side sections 26B from the seat width direction outer side and the seat rear side, and covering the pad central section 26A from the seat rear side.

Each of the front side covers 38 is stitched to the front cover 36 at a stitching portion 44, and is stitched to the rear side cover 40 at a stitching portion 46. The stitching portion 46 between the front side cover 38 and the rear side cover 40 is positioned in the vicinity of a front edge portion 16A1 (what is referred to as a frame portion) of the side section 16A. The stitching portion 46 is configured so as to split open together with the pad side section 26B when a side airbag main body 62, described later, inflates and deploys.

Side Airbag Device 14 Configuration

As illustrated in FIG. 1 to FIG. 3, the side airbag device 14 includes a side airbag 50, a gas generator 51, and a reaction force plate 100 serving as a reaction force member. The side airbag 50, the gas generator 51, and the reaction force plate 100 are ordinarily configured as an airbag module 54, illustrated in FIG. 3, and stored inside the side section 16A. Detailed explanation follows regarding the respective configuration elements of the side airbag device 14. Note that in the following explanation, the front, rear, upward, and downward directions of the side airbag 50 refer to the directions in an inflated and deployed state of the side airbag 50, and substantially correspond to the front, rear, upward, and downward directions of the seatback 16.

Gas Generator Configuration

The gas generator 51 is configured by an inflator 52 and a diffuser 53 (not illustrated in FIG. 1). The inflator 52 is what is referred to as a cylinder type inflator, and is formed in a circular column shape. The inflator 52 is installed at the seat width direction outer side (vehicle width direction outside) of the side wall portion 30A of the outer side frame 30, in an orientation in which its axial direction runs along a height direction of the seatback 16. The diffuser 53 is formed from metal in a tube shape, and is installed at the vehicle width direction outside of the side wall portion 30A in an orientation in which its axial direction runs along the height direction of the seatback 16. The inflator 52 is inserted inside the diffuser 53. The diffuser 53 has a function of splitting (regulating) gas generated by the inflator 52 in the up-down direction of the seatback 16.

A pair of upper and lower stud bolts 52A (see FIG. 2 and FIG. 3) project out from an outer peripheral portion of the inflator 52 toward the seat width direction inner side. The stud bolts 52A penetrate the diffuser 53 and the side wall portion 30A, and nuts 56 are screwed onto leading end sides of the stud bolts 52A. The inflator 52 is thereby fastened and fixed (by what is referred to as side face fastening) to the outer side frame 30 together with the diffuser 53. Note that there is no limitation to a configuration in which the upper and lower stud bolts 52A are provided to the inflator 52, and configuration may be made in which the stud bolts 52A are provided to the diffuser 53. In such cases, configuration is made in which the inflator 52 is fixed to the diffuser 53 by crimping or the like.

Plural gas ejection ports (not illustrated in the drawings) are formed in a row around a peripheral direction of the inflator 52 at an upper end portion or a lower end portion of the inflator 52 (at a lower end portion in this example). Gas is ejected through the plural gas ejection ports in a radial pattern when the inflator 52 is set off (actuated). As illustrated in FIG. 1, the inflator 52 is electrically connected to a side collision ECU 58 installed to the vehicle. A side collision sensor 60 that detects a side-on collision is also electrically connected to the side collision ECU 58. The side collision ECU 58 is configured so as to set off the inflator 52 on detection of (the inevitability of) a side-on collision based on signals from the side collision sensor 60. Note that in cases in which a collision prediction sensor (pre-crash sensor) that predicts (foresees) a side-on collision is electrically connected to the side collision ECU 58, configuration may be made such that the side collision ECU 58 sets off the inflator 52 when a side-on collision has been predicted based on signals from the collision prediction sensor.

Side Airbag Configuration

The side airbag 50 is configured by the side airbag main body 62, and an inner bag section 64. The side airbag main body 62 inflates and deploys toward the seat front side of the side section 16A on receipt of gas supplied from the inflator 52 that is housed inside the side airbag main body 62, so as to be present between the occupant P and a vehicle body side section (a door trim 63 of a side door and a B pillar garnish 65, illustrated in FIG. 2, in this example). The inner bag section 64 is supplied with gas from the inflator 52 through the side airbag main body 62, and inflates within the side section 16A. Note that the door trim 63 and the B pillar garnish 65 are not illustrated in the drawings, with the exception of FIG. 2.

The side airbag main body 62 is disposed at the seat width direction outer side of the outer side frame 30. The side airbag main body 62 is formed in a bag shape, for example by overlapping and stitching together outer peripheral edge portions of two base cloths 66, 68, formed by cutting out substantially elliptical shapes from a nylon-based or polyester-based fabric, at a stitching portion T1 (see FIG. 2 to FIG. 4; not illustrated or labelled in the other drawings).

Note that there is no limitation to the manufacturing method of the side airbag main body 62 described above, and appropriate modifications may be made thereto. For example, the side airbag main body 62 may be manufactured by folding a single base cloth in two and stitching together at outer peripheral edge portions. As another example, the side airbag main body 62 may be manufactured using a hollow weaving method (what is referred to as an OPW method) using an automatic loom. Similar also applies to the inner bag section 64, described later.

As illustrated in FIG. 2, in an inflated and deployed state of the side airbag main body 62, one base cloth 66 is disposed facing the seat width direction inner side (occupant P side), and the other base cloth 68 is disposed facing the seat width direction outer side (the door trim 63 and B pillar garnish 65 side). As illustrated in FIG. 1, as viewed from the side in the inflated and deployed state, the side airbag main body 62 is formed in a substantially elliptical elongated shape along the height direction of the seatback 16, and is formed with a size capable of restraining the shoulder S, chest C, belly B, and lumbar L of the occupant P.

Figure 7:
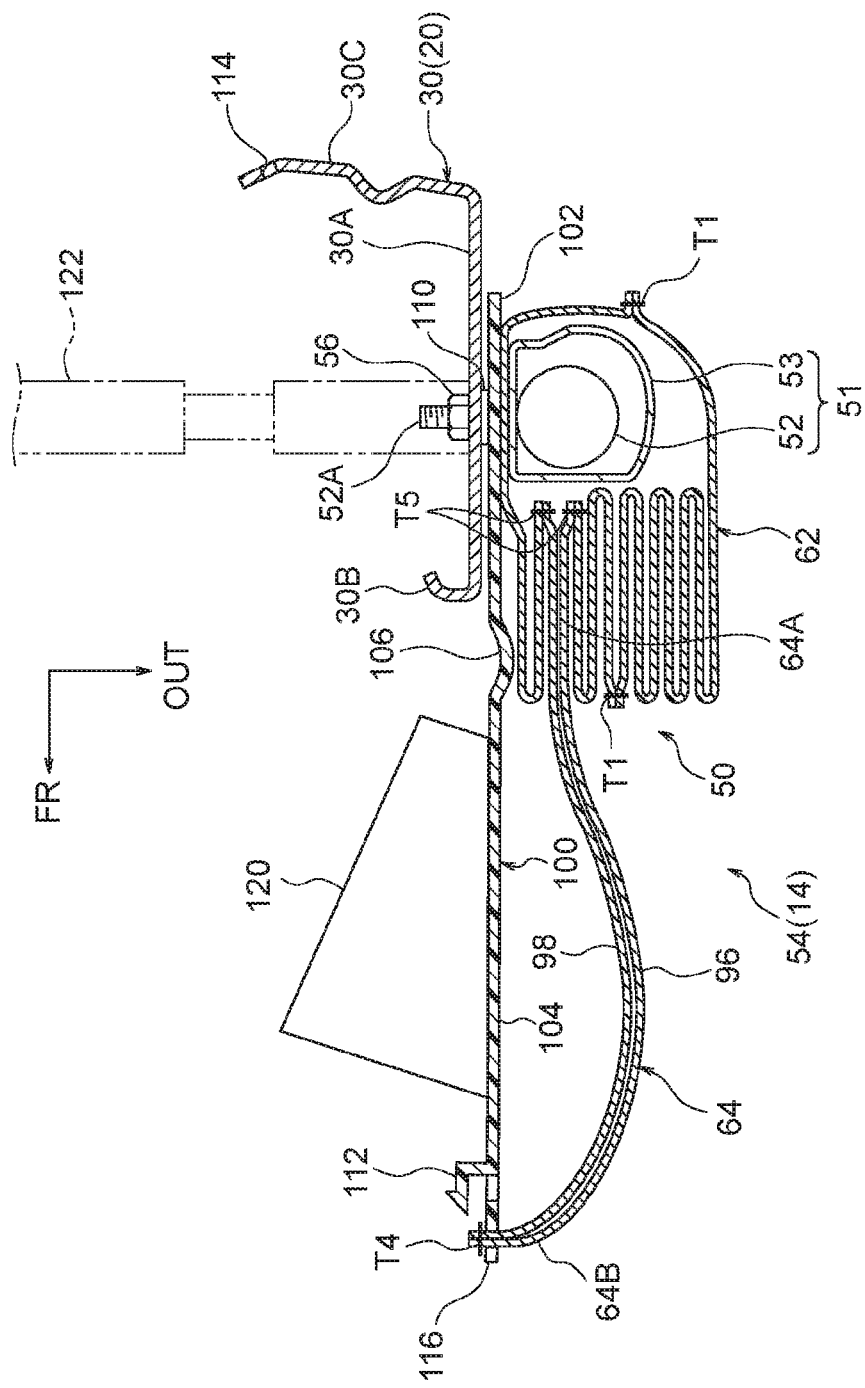
FIG. 7 is a plan view cross-section to explain how an airbag module including a reaction force plate is fastened and fixed to an outer side frame.
Figure 8:
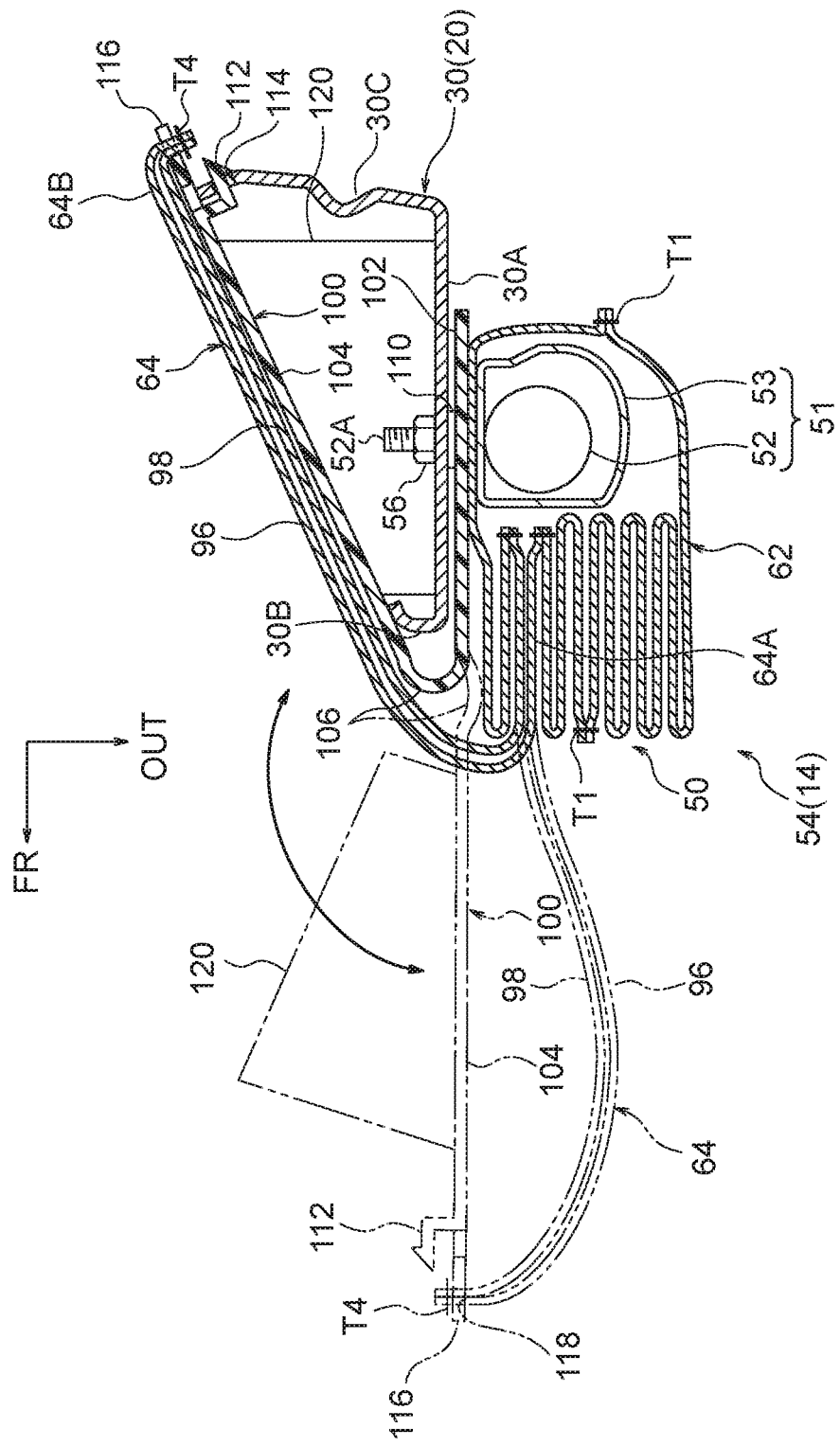
FIG. 8 is a plan view cross-section illustrating a state in which attachment of an airbag module to an outer side frame has been completed.

The side airbag main body 62 is partitioned into a front bag section 72 and a rear bag section 74 by an internally provided tether 70 (partitioning cloth; not illustrated in FIG. 3, FIG. 7, or FIG. 8). The tether 70 is formed in an elongated strap shape using a similar fabric to that of the base cloths 66, 68. One long side edge portion of the tether 70 is stitched to the base cloth 66 at a stitching portion T2 (see FIG. 2; not illustrated in FIG. 3), and the other long side edge portion of the tether 70 is stitched to the base cloth 68 at a stitching portion T3 (see FIG. 2; not illustrated or not labeled in the other drawings).

The tether 70 is set so as to extend along the front edge portion 16A1 of the side section 16A of the seatback 16 in the height direction of the seatback 16 in the inflated and deployed state of the side airbag main body 62. An upper side inner vent hole 76 is formed at an upper end portion of the tether 70, and a lower side inner vent hole 78 is formed at a lower end portion of the tether 70. The inside of the front bag section 72 and the inside of the rear bag section 74 are in communication with each other through the upper side inner vent hole 76 and the lower side inner vent hole 78.

Figure 4:
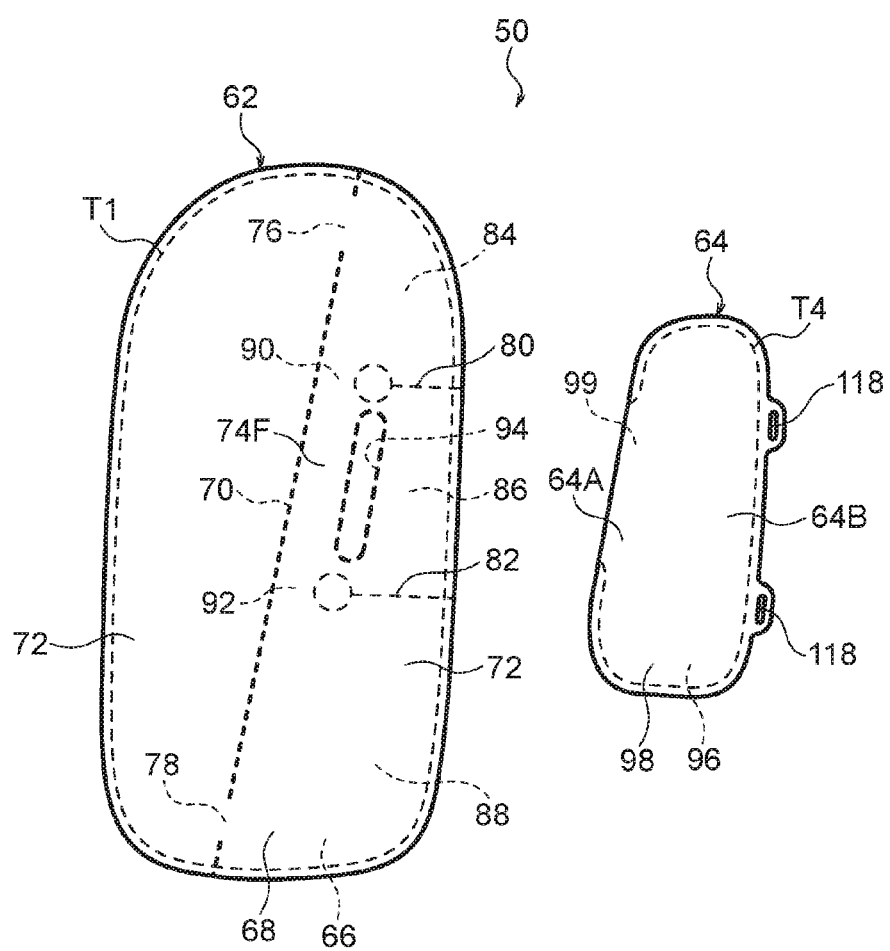
FIG. 4 is a plan view illustrating a side airbag main body and an inner bag section opened out in a state prior to joining a side airbag main body and an inner bag section together.

As illustrated in FIG. 1 and FIG. 4, a pair of upper and lower partitioning portions 80, 82 are provided at an up-down direction intermediate portion of the rear bag section 74. The upper and lower partitioning portions 80, 82 are non-inflating portions configured by stitched portions (seams) where the base cloths 66, 68 of the side airbag main body 62 are stitched together, and extend from a rear end edge of the rear bag section 74 toward a front end edge of the rear bag section 74. Note that the upper and lower partitioning portions 80, 82 may be configured by partitioning cloth similar to that of the tether 70.

Terminal processing to prevent fraying is performed by stitching circular shapes at front end portions of the respective partitioning portions 80, 82. The rear bag section 74 is partitioned into an upper chamber 84, an up-down direction intermediate chamber 86, and a lower chamber 88 by the partitioning portions 80, 82. Note that the front end portions of the respective partitioning portions 80, 82 are positioned further toward the rear end side of the rear bag section 74 than the tether 70. The inside of the upper chamber 84, the inside of the up-down direction intermediate chamber 86, and the inside of the lower chamber 88 are accordingly in communication with each other on a front portion 74F side of the rear bag section 74. More specifically, the inside of the upper chamber 84 and the inside of the up-down direction intermediate chamber 86 are in communication with each other through a communication path 90 formed between the front end portion of the partitioning portion 80 and the tether 70, and the inside of the up-down direction intermediate chamber 86 and the inside of the lower chamber 88 are in communication with each other through a communication path 92 formed between the front end portion of the partitioning portion 82 and the tether 70.

The upper chamber 84 is in communication with the inside the front bag section 72 through the upper side inner vent hole 76 described above, and the lower chamber 88 is in communication with the inside of the front bag section 72 through the lower side inner vent hole 78 described above. The upper side inner vent hole 76 is at a position at a separation toward the upper end side of the side airbag 50 with respect to the upper side partitioning portion 80, and the lower side inner vent hole 78 is at a position at a separation toward the lower end side of the side airbag main body 62 with respect to the lower side partitioning portion 82. The inflator 52 described above is housed at a rear end portion inside the up-down direction intermediate chamber 86. The upper and lower stud bolts 52A of the inflator 52 penetrate the base cloth 66, such that the inflator 52 is utilized to fix (fasten and fix) the side airbag main body 62 to an up-down direction intermediate portion of the side wall portion 30A.

As illustrated in FIG. 3, a front section side location of the side airbag main body 62 configured as described above, including the front bag section 72, is normally stored at the seat width direction outer side of the outer side frame 30, in a state folded into a concertina shape with overlapping folds in the seat width direction.

In the inflated and deployed state of the side airbag main body 62, as illustrated in FIG. 1, the front bag section 72 restrains a front region side of the occupant P from the shoulder S to the lumbar L, and the rear bag section 74 restrains a rear region side of the occupant P from the shoulder S to the lumbar L. The rear bag section 74 is configured such that at least a location of the rear bag section 74 further to the upper side than the vicinity of the waist of the occupant P is positioned further to the seat rear side than the front edge portion 16A1 of the side section 16A of the seatback 16. However, the front portion 74F of the rear bag section 74 is configured so as to be positioned further to the seat front side than the front flange portion 30B of the outer side frame 30 (a front end portion of the outer side frame 30) in the inflated and deployed state of the side airbag 50.

The side airbag main body 62 is formed with a communication port 94 at a location that faces the seat width direction inner side and configures the front portion 74F of the rear bag section 74 in the inflated and deployed state (at a central side of the base cloth 66 in this example). The communication port 94 is formed in an elongated shape (an elliptical shape in this example) with its length running along the up-down direction of the side airbag main body 62, and is positioned at an up-down direction intermediate portion of the rear bag section 74. The communication port 94 is formed at a position overlapping with a front portion of the up-down direction intermediate chamber 86 as viewed from the side in the inflated and deployed state of the side airbag main body 62. The communication port 94 is aligned with the inner bag section 64.

The inner bag section 64 is formed in an elongated bag shape by overlapping and stitching together outer peripheral edge portions of two base cloths 96, 98, formed by cutting out substantially elliptical shapes from a fabric similar to that of the base cloths 66, 68, at a stitching portion T4 (see FIG. 2 to FIG. 4; not illustrated in FIG. 1). The inner bag section 64 is formed substantially in an elongated elliptical shape running along the height direction of the seatback 16 as viewed from the side in the inflated and deployed state, as illustrated in FIG. 1. The inner bag section 64 is set with an up-down direction dimension and a front-rear direction dimension sufficiently smaller than those of the side airbag main body 62, and is formed with a volume sufficiently smaller than that of the side airbag main body 62.

The stitching portion T4 is absent from a base end portion 64A of the inner bag section 64 (one long side edge portion; front end portion). An opening 99 is thereby formed at the base end portion 64A of the inner bag section 64. An edge portion of the opening 99 of the inner bag section 64 is stitched (joined) to a peripheral edge portion of the communication port 94 at a stitching portion T5, illustrated in FIG. 2. The base end portion 64A of the inner bag section 64 is thereby joined to the front portion 74F of the rear bag section 74, and the inside of the front portion 74F of the rear bag section 74 and the inside of the inner bag section 64 are in communication with each other through the communication port 94. Specifically, the communication port 94 places the inside of a front portion of the up-down direction intermediate chamber 86 in the rear bag section 74 in communication with the inside of the inner bag section 64, such that the inside of the up-down direction intermediate chamber 86 and the inside of the inner bag section 64 are in communication with each other directly, and not through the inside of the upper chamber 84 and the inside of the lower chamber 88.

The inner bag section 64 extends from the front portion 74F of the rear bag section 74 past the seat front of the front flange portion 30B, and extends to the seat width direction inner side of the outer side frame 30. The inner bag section 64 extends obliquely toward the seat rear side and the seat width direction inner side at the seat width direction inner side of the outer side frame 30. As illustrated in FIG. 3, the inner bag section 64 is configured so as to be housed inside the side section 16A in a state spread out in a flat shape, and is interposed between a reaction force plate portion 104 of the reaction force plate 100, described later, and the seatback pad 26 at the seat width direction inner side of the outer side frame 30. A leading end portion 64B (rear end portion) of the inner bag section 64 is formed with a pair of upper and lower hooking holes 118. The hooking holes 118 are formed in a non-inflating portion provided at the rear end portion of the inner bag section 64, and are elongated holes with their length running along the length direction of the inner bag section 64. Note that configuration may be made in which the inner bag section 64 is housed inside the side section 16A in a partially folded state (for example, a state in which a front-rear direction intermediate portion of the inner bag section 64 is folded into a Z shape).

As viewed from the side of the seat, the inner bag section 64 is disposed so as to face the rear region side of the chest C and the belly B of the occupant P (a region on the side of the back, including a rear region side of the ribs) from the seat width direction outer side, as illustrated in FIG. 1. The inside of the inner bag section 64 configured as described above is supplied with gas generated by the inflator 52 inside the rear bag section 74 through the communication port 94, and inflates within the side section 16A. The inflated inner bag section 64 receives a reaction force from the reaction force plate portion 104 of the reaction force plate 100, described later, and inflates toward the seat width direction inner side and the seat front side (see FIG. 2). Accordingly, configuration is made in which the rear region side of the chest C and the belly B of the occupant P are restrained by the inner bag section 64 through the seatback pad 26 and the seat cover 28. Note that it is sufficient that the inner bag section 64 be capable of restraining at least the rear region side of the chest C (the rear region side of the ribs).

In the side airbag 50 configured as described above, the inflator 52 is housed inside the up-down direction intermediate chamber 86 in the rear bag section 74 of the side airbag main body 62. Accordingly, when the inflator 52 is set off, gas is supplied into the up-down direction intermediate chamber 86 first. The up-down direction intermediate chamber 86 accordingly inflates. Next, a portion of the gas supplied into the up-down direction intermediate chamber 86 is supplied into the inner bag section 64 through the communication port 94, and the inner bag section 64 inflates. Next, a portion of the gas supplied into the up-down direction intermediate chamber 86 is supplied into the upper chamber 84 and the lower chamber 88 of the rear bag section 74 through the communication paths 90, 92, and the upper chamber 84 and the lower chamber 88 inflate. Next, a portion of the gas supplied into the upper chamber 84 and the lower chamber 88 is supplied into the front bag section 72 through the upper side inner vent hole 76 and the lower side inner vent hole 78, and the front bag section 72 inflates. Note that the timings at which the gas is supplied into the upper chamber 84 and the lower chamber 88 can be adjusted by modifying the positions of the front end portions of the upper and lower partitioning portions 80, 82 so as to change the cross-sectional area of the communication paths 90, 92.

Reaction Force Plate Configuration

Figure 5:
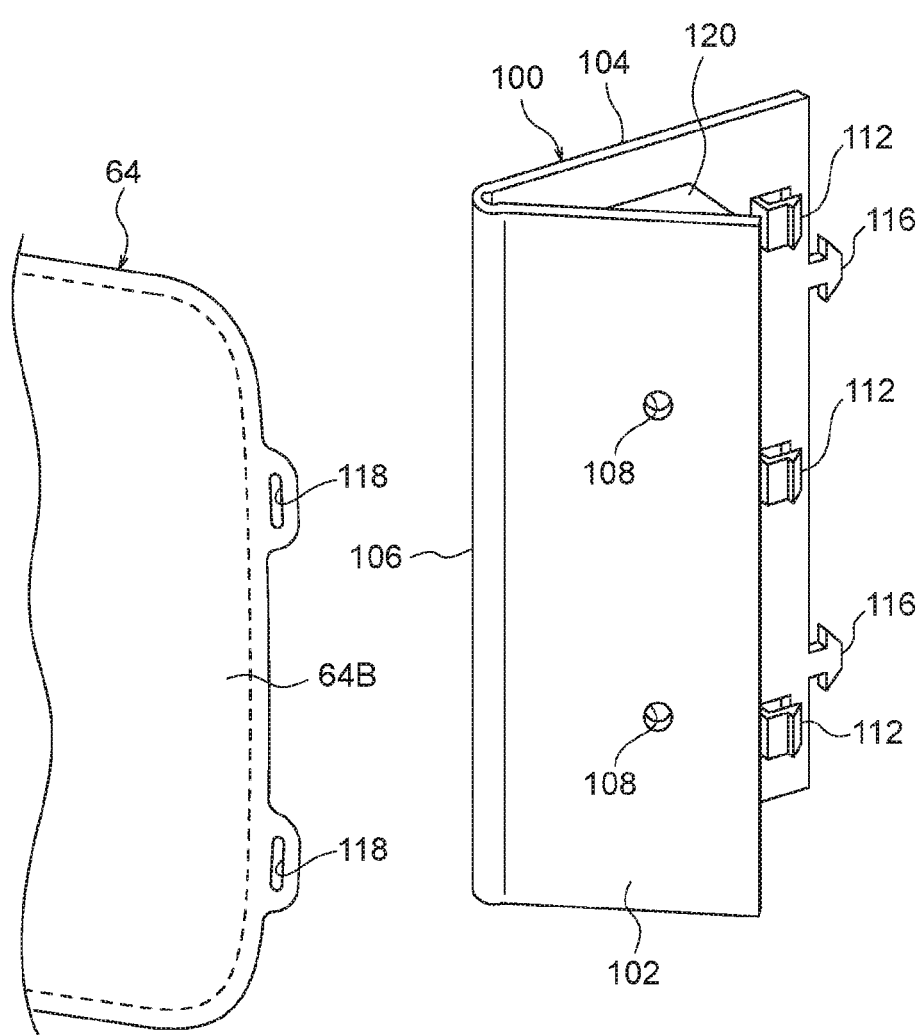
FIG. 5 is a perspective view illustrating a reaction force plate serving as a reaction force member, and a portion of an inner bag section.
Figure 6:
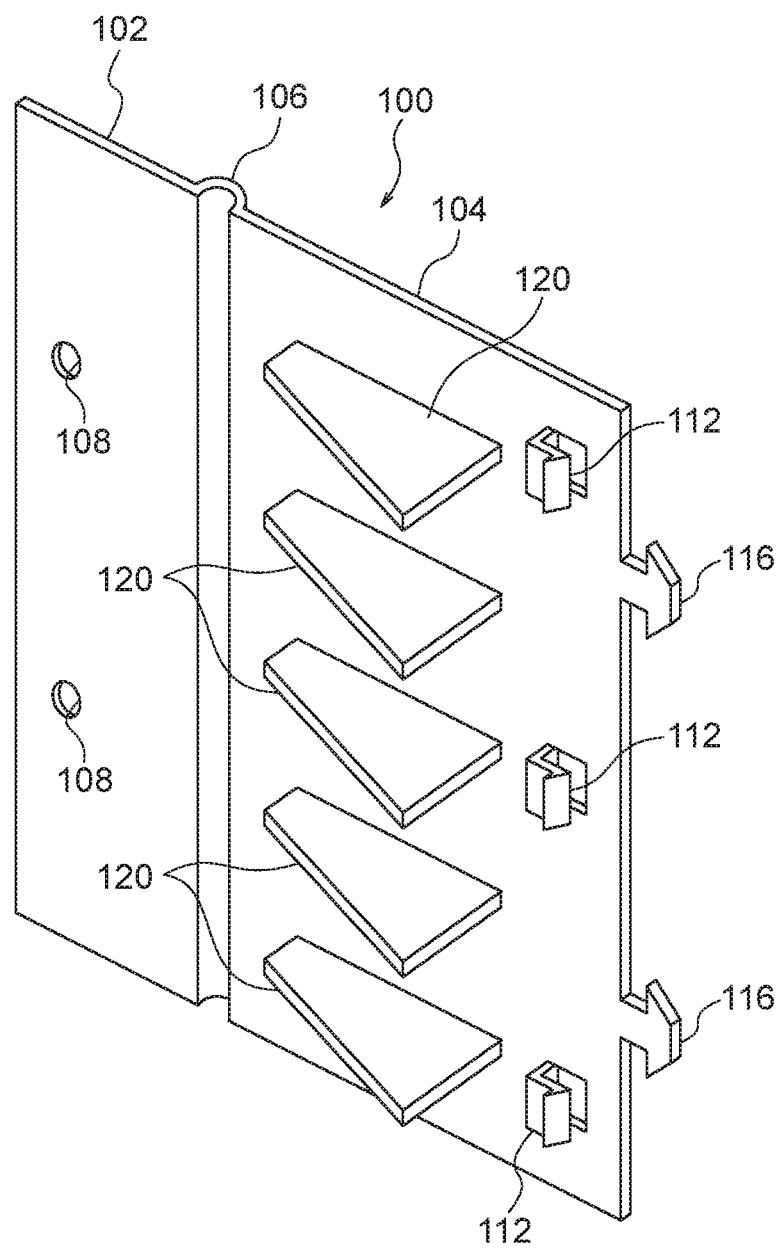
FIG. 6 is a perspective view illustrating a reaction force plate in an opened out state.

As illustrated in FIG. 3, FIG. 5, FIG. 6 and the like, the reaction force plate 100 is formed from a resin in a plate shape, and configures part of the airbag module 54. The reaction force plate 100 includes a fixing plate portion 102 serving as a fixing portion fixed to the outer side frame 30, and the reaction force plate portion 104 serving as a reaction force application portion that applies a reaction force to the inner bag section 64 during inflation. The fixing plate portion 102 and the reaction force plate portion 104 are integrally coupled together through an integral hinge 106. The reaction force plate 100 has a substantially V-shape opening toward the seat rear side in plan view cross-section of the seatback 16.

The fixing plate portion 102 is formed in an elongated rectangular plate shape with its length direction running along the height direction of the seatback 16. The fixing plate portion 102 is disposed at the seat width direction outer side of the outer side frame 30 in an orientation in which a thickness direction of the fixing plate portion 102 runs in the seat width direction. The fixing plate portion 102 is superimposed on the side wall portion 30A of the outer side frame 30 from the seat width direction outer side, and is interposed between the side airbag main body 62 and the side wall portion 30A.

A length direction dimension of the fixing plate portion 102 is set slightly longer than a length direction dimension of the inner bag section 64, and the fixing plate portion 102 is disposed at a position overlapping with the inner bag section 64 as viewed from the side of the seat. The fixing plate portion 102 is set with a shorter seat front-rear direction dimension than the outer side frame 30. A front end portion of the fixing plate portion 102 projects out slightly further toward the seat front side than the front flange portion 30B of the outer side frame 30, and faces the base end portion 64A of the inner bag section 64 from the rear of the seat from a close proximity.

The fixing plate portion 102 is formed with a pair of upper and lower bolt insertion holes 108. The upper and lower stud bolts 52A of the inflator 52 are inserted through the bolt insertion holes 108, and the inflator 52 is utilized to fasten and fix the fixing plate portion 102 to the side wall portion 30A (see FIG. 2 and FIG. 3). Note that an anti-removal washer 110 is fitted to at least one out of the upper and lower stud bolts 52A inserted through the bolt insertion holes 108. The anti-removal washer 110 is disposed between the fixing plate portion 102 and the side wall portion 30A. The anti-removal washer 110 is a temporary fixing member that temporarily fixes the fixing plate portion 102 to the inflator 52 during the manufacturing stage of the airbag module 54, and is formed with plural inner teeth (not illustrated in the drawings) at an inner peripheral portion. The plural inner teeth are configured so as to hold onto an outer peripheral portion of the stud bolt 52A.

The reaction force plate portion 104 is formed in an elongated rectangular plate shape with its length direction running along the height direction of the seatback 16, and is coupled to the fixing plate portion 102 at the seat front side of the outer side frame 30. Specifically, the integral hinge 106 is integrally connected to a front end portion of the fixing plate portion 102, and the reaction force plate portion 104 extends out integrally from an end portion of the integral hinge 106 described above on the opposite side to the fixing plate portion 102. The reaction force plate portion 104 extends from a seat front side of the outer side frame 30 toward the seat width direction inner side of the outer side frame 30, and is inclined toward the seat width direction inner side on progression toward the seat rear side.

The reaction force plate portion 104 is set with a length direction dimension the same as, or equivalent to, the length direction dimension of the fixing plate portion 102, and is disposed at a position overlapping with the inner bag section 64 as viewed from the side of the seat. The reaction force plate portion 104 is set with a length dimension in the seat front-rear direction equivalent to or slightly longer than that of the outer side frame 30, and is interposed between the outer side frame 30 and the inner bag section 64. An opening of the outer side frame 30 is blocked off by the reaction force plate portion 104 in plan view cross-section of the seatback 16.

A base end portion (an end portion on the integral hinge 106 side; front end portion) of the reaction force plate portion 104 abuts, or faces from a close proximity, the leading end portion (seat width direction inner side end portion) of the front flange portion 30B from the seat width direction inner side. A leading end portion (an end portion on the opposite side to the integral hinge 106; a rear end portion) of the reaction force plate portion 104 abuts, or faces from a close proximity, a leading end portion (seat width direction inner side end portion) of the rear flange portion 30C from the seat width direction inner side. Namely, the respective leading end portions of the front flange portion 30B and the rear flange portion 30C are covered by the reaction force plate portion 104 from the seat width direction inner side. Accordingly, the inner bag section 64 does not contact the respective leading end portions of the front flange portion 30B or the rear flange portion 30C.

The leading end portion of the reaction force plate portion 104 is formed with one or plural anchor claws 112 (three in the present example). The anchor claws 112 project out toward the outer side frame 30 side (the seat width direction outer side), and form a row along the length direction of the reaction force plate portion 104. The anchor claws 112 are configured with L-shaped cross-sections as viewed along the height direction of the seatback 16, and leading end portions of the respective anchor claws 112 are formed with hook shaped claw portions. The leading end portion of the rear flange portion 30C is formed with one or plural anchor holes 114 (three in the present example) corresponding to the anchor claws 112. The anchor holes 114 form a row along the height direction of the seatback 16. The respective anchor claws 112 are inserted into the respective anchor holes 114 and hook onto edge portions of the respective anchor holes 114. The leading end portion of the reaction force plate portion 104 is thereby anchored to the leading end portion of the rear flange portion 30C.

Note that the method for anchoring the reaction force plate portion 104 to the outer side frame 30 is not limited to the above, and may be modified as appropriate. For example, configuration may be made in which anchor claws formed to the rear flange portion 30C are inserted into and anchored to anchor holes formed in the reaction force plate portion 104. Moreover, for example, the reaction force plate portion 104 may be anchored to the outer side frame 30 by a method such as clip fastening or screw fastening.

A leading end of the reaction force plate portion 104 is formed with one or plural hooking claws 116 (two in the present example). The hooking claws 116 form a row along the length direction of the reaction force plate portion 104. The hooking claws 116 project out from the leading end of the reaction force plate portion 104 toward the seat rear side, and are substantially T-shaped as viewed along the seat width direction. The hooking claws 116 are inserted into the plural (two in the present example) hooking holes 118 formed at the leading end portion 64B of the inner bag section 64, and hook onto edge portions of the respective hooking holes 118. The leading end portion 64B of the inner bag section 64 is thereby anchored to the leading end portion of the reaction force plate portion 104. Note that the method for anchoring the inner bag section 64 to the reaction force plate portion 104 is not limited to the above, and may be modified as appropriate. For example, configuration may be made in which the leading end portion 64B of the inner bag section 64 is anchored to the leading end portion of the reaction force plate portion 104 by a method such as clip fastening, stitching or the like. Moreover, there is no limitation to a configuration in which the leading end portion 64B of the inner bag section 64 is anchored to the leading end portion of the reaction force plate portion 104, and the position where the inner bag section 64 is anchored to the reaction force plate portion 104 may be modified as appropriate. For example, configuration may be made in which front-rear direction intermediate portions of both upper and lower end portions of the inner bag section 64 are anchored to front-rear direction intermediate portions of both upper and lower end portions of the reaction force plate portion 104.

The reaction force plate 100 includes one or plural ribs 120 (five in the present example) extending out from the reaction force plate portion 104 toward the side of the side wall portion 30A of the outer side frame 30. The respective ribs 120 are formed in plate shapes, and are disposed between the front flange portion 30B and the rear flange portion 30C in an orientation in which a thickness direction of the ribs 120 runs along the height direction of the seatback 16. The ribs 120 form a row along the height direction of the seatback 16. Each of the ribs 120 is formed in a substantially trapezoidal shape in plan view cross-section of the seatback 16, and a seat width direction outer side end portion of each of the ribs 120 runs along the side wall portion 30A. The seat width direction outer side end portion of each of the ribs 120 abuts, or faces from a close proximity, the side wall portion 30A. The ribs 120 accordingly configure flexure prevention portions (spacers) that prevent or suppress the reaction force plate portion 104 from flexing toward the side wall portion 30A side. Note that the shape of the flexure prevention portions extending from the reaction force plate portion 104 toward the side wall portion 30A side is not limited to the above, and may be modified as appropriate. For example, the flexure prevention portions may be column shaped or tube shaped, or may be box shaped and open toward the side wall portion 30A side.

The reaction force plate 100 configured as described above is molded in the opened out state illustrated in FIG. 6 and FIG. 7. In the opened out state, the fixing plate portion 102 and the reaction force plate portion 104 extend out toward opposite sides to each other about the integral hinge 106, and the reaction force plate 100 has a substantially flat plate shape. The airbag module 54 is manufactured by attaching the side airbag 50 and the inflator 52 to the reaction force plate 100 in this opened out state.

During manufacture of the airbag module 54, first, the inflator 52 mounted with the diffuser 53 is housed inside the rear bag section 74 of the side airbag main body 62, and the side airbag main body 62 is folded up. Then, the upper and lower stud bolts 52A of the inflator 52 that penetrate the base cloth 66 of the side airbag main body 62 are inserted through the bolt insertion holes 108 of the fixing plate portion 102, and the anti-removal washer 110 is mounted onto the stud bolt 52A. The inflator 52 and the side airbag main body 62 are thereby temporarily fixed to the reaction force plate 100. The hooking claws 116 of the reaction force plate portion 104 are inserted into the hooking holes 118 of the inner bag section 64, thereby anchoring the inner bag section 64 to the reaction force plate portion 104. This thereby completes the airbag module 54.

During attachment of the completed airbag module 54 to the outer side frame 30, the upper and lower stud bolts 52A of the inflator 52 are inserted through bolt insertion holes, not illustrated in the drawings, formed in the outer side frame 30, and the respective nuts 56 are screwed onto the upper and lower stud bolts 52A (see FIG. 7). Note that in FIG. 7, the reference numeral 122 indicates an impact wrench, this being a tool for tightening the nuts 56. Next, as illustrated in FIG. 8, the reaction force plate portion 104 to which the inner bag section 64 is anchored is rotated toward the seat width direction inner side about the integral hinge 106, and the plural anchor claws 112 are inserted into the plural anchor holes 114. This thereby restricts the reaction force plate portion 104 from rotating due to elastic recovery of the integral hinge 106, completing attachment of the airbag module 54 to the outer side fame 30.

Note that the reaction force plate 100 is not limited to a configuration including the integral hinge 106, and the reaction force plate 100 may be molded with a substantially V-shaped cross-section, as illustrated in FIG. 2 and FIG. 3. However, in such cases, it is necessary to form the reaction force plate portion 104 with an insertion hole to allow insertion of a tool such as the impact wrench 122. Configuration is made such that the inner bag section 64 is anchored to the reaction force plate portion 104 after fixing the fixing plate portion 102 to the outer side frame 30.

Operation and Advantageous Effects

Next, explanation follows regarding operation and advantageous effects of the present exemplary embodiment.

In the present exemplary embodiment, when the side collision ECU 58 detects a side-on collision based on a signal from the side collision sensor 60, the inflator 52 housed inside the rear bag section 74 of the side airbag main body 62 is set off by the side collision ECU 58. Gas from the inflator 52 is accordingly supplied into the rear bag section 74. The rear bag section 74 inflates and deploys, and the inner bag section 64, of which an internal portion is in communication with the inside of the front portion 74F of the rear bag section 74, receives gas supplied from inside the rear bag section 74 and inflates within the side section 16A of the seatback 16. Gas supplied into the rear bag section 74 passes through the upper side inner vent hole 76 and the lower side inner vent hole 78 and is supplied into the front bag section 72, and the front bag section 72 inflates and deploys.

Note that in the present exemplary embodiment, the reaction force plate portion 104 of the reaction force plate 100 is interposed between the inner bag section 64 and the outer side frame 30. The reaction force plate 100 includes the fixing plate portion 102 fixed to the outer side frame 30, and the reaction force plate portion 104 described above applies a reaction force to the inner bag section 64 during inflation of the inner bag section 64. This thereby enables the inner bag section 64 to be prevented or suppressed from escaping to the outer side frame 30 side (the seat width direction outer side) during occupant restraint. Occupant restraint performance of the inner bag section 64 can thereby be improved. Moreover, the inner bag section 64 is anchored to the reaction force plate portion 104. This thereby enables positional displacement of the inner bag section 64 to be prevented or suppressed when the seatback frame 20 is being covered by (assembled with) the seatback pad 26. This thereby enables the ease of assembly of the seatback pad 26 to the seatback frame 20 to be improved.

In the present exemplary embodiment, the respective leading end portions of the front flange portion 30B and the rear flange portion 30C provided to the outer side frame 30 are covered from the seat width direction inner side by the reaction force plate portion 104 that is interposed between the outer side frame 30 and the inner bag section 64. This thereby enables edges of the respective leading end portions of the front flange portion 30B and the rear flange portion 30C to be prevented from contacting the inner bag section 64. Damage to the inner bag section 64 due to such contact can thereby be prevented.

Figure 9:
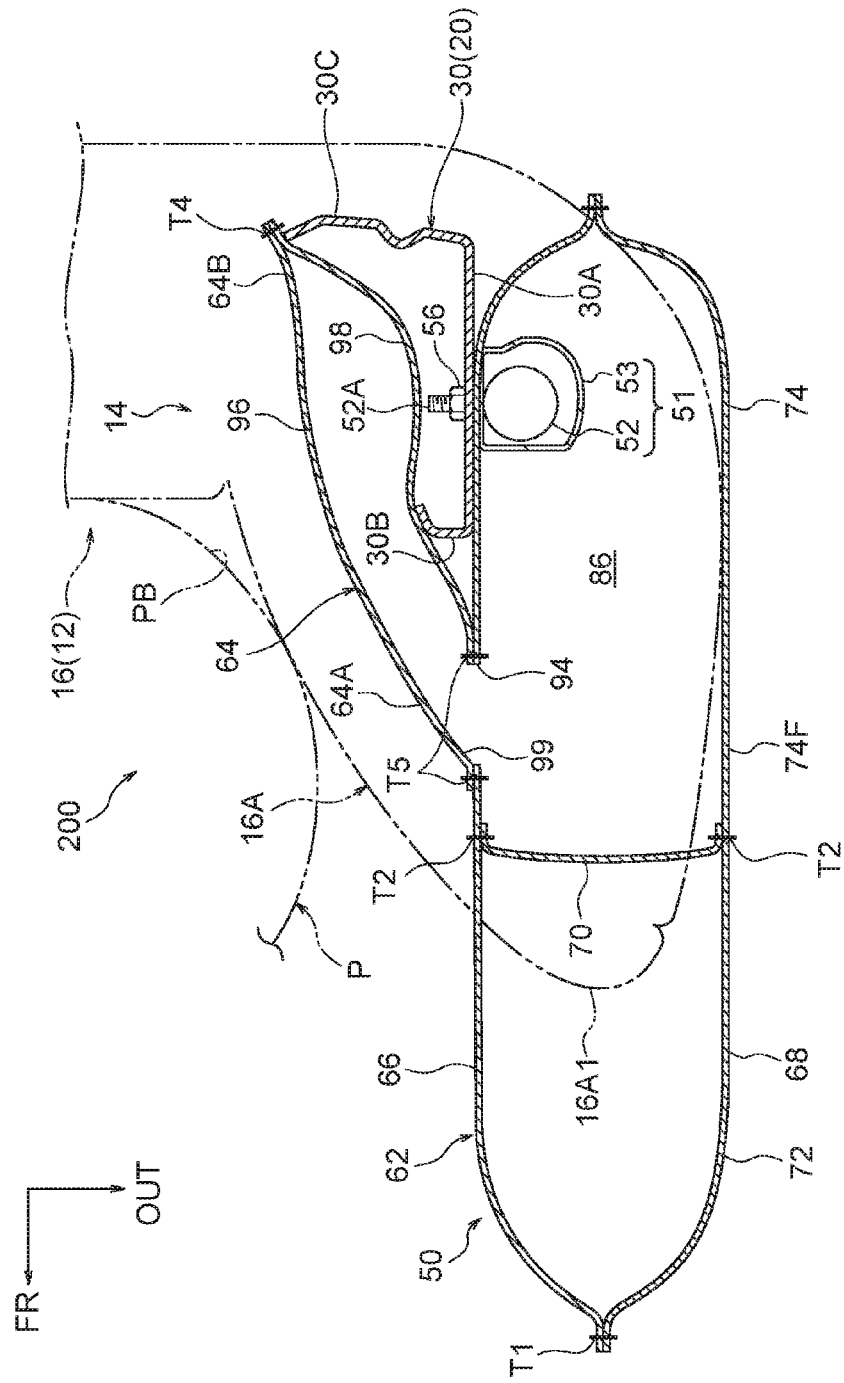
FIG. 9 is a cross-section corresponding to FIG. 2, illustrating a comparative example.

Supplementary explanation follows regarding the above advantageous effects, with reference to a comparative example 200, illustrated in FIG. 9. The comparative example 200 does not include the reaction force plate 100 according to the present exemplary embodiment, but is otherwise configured similarly to the present exemplary embodiment. In the comparative example 200, as illustrated in FIG. 9, there is a possibility that the inner bag section 64 could escape to the outer side frame 30 side during occupant restraint, thereby lowering the occupant restraint performance of the inner bag section 64. Moreover, in the comparative example 200, the inner bag section 64 is not anchored to the reaction force plate 100. There is accordingly a possibility of positional displacement of the inner bag section 64 during assembly of the seatback pad 26 to the seatback frame 20. It is thus possible that preventing such positional displacement in an assembly operation of the seatback pad 26 could become complex and frustrating. Moreover, there is a possibility of damage to the inner bag section 64 due to edges of the respective leading end portions of the front flange portion 30B and the rear flange portion 30C contacting the inner bag section 64. The present exemplary embodiment is capable of addressing such issues.

In the present exemplary embodiment, the fixing plate portion 102 of the reaction force plate 100 is disposed at the seat width direction outer side of the outer side frame 30, together with the side airbag main body 62, and is fixed to the outer side frame 30 together with the side airbag main body 62 using the stud bolts 52A of the inflator 52. Such a configuration enables, for example, the side airbag main body 62 from which the inner bag section 64 extends out, and the fixing plate portion 102 of the reaction force plate 100, to be temporarily fixed using the stud bolts 52A of the inflator 52, and enables the respective configuration elements above to be configured as a module during the manufacturing stage of the side airbag device 14. Ease of assembly, for example when attaching the respective configuration elements above to the outer side frame 30, is accordingly improved. Component management is accordingly easier than in a configuration in which the reaction force plate 100 is not configured as a module together with the side airbag main body 62, the inflator 52, and the like.

In the present exemplary embodiment, the fixing plate portion 102 disposed at the seat width direction outer side of the outer side frame 30 and the reaction force plate portion 104 disposed at the seat width direction inner side of the outer side frame 30 are coupled together at the seat front side of the outer side frame 30. Namely, the reaction force plate portion 104 extends from the seat front side of the outer side frame 30 toward the seat width direction inner side of the outer side frame 30, similarly to the inner bag section 64. Since the extension length of the reaction force plate portion 104 can be made shorter than in configurations in which, for example, the reaction force plate portion 104 extends out from the seat rear side of the outer side frame 30 toward the seat width direction inner side of the outer side frame 30, a contribution can be made to reducing the size and weight of the reaction force plate 100.

In the present exemplary embodiment, the reaction force plate portion 104 is inclined toward the seat width direction inner side on progression toward the seat rear side. Note that a location PB (see FIG. 2 and FIG. 3) at the back side of a side face of the upper body of the occupant P leaning against the seatback 16 curves toward the seat width direction inner side on progression toward the seat rear side. Namely, the reaction force plate portion 104 is inclined so as to follow the back side location PB. This facilitates inflation of the inner bag section 64 toward the back side location PB when the inner bag section 64 receives a reaction force from the reaction force plate portion 104 and inflates, thereby enabling good restraint of the back side location PB by the inner bag section 64. Moreover, the thickness of the seatback pad 26 between the back side location PB and the reaction force plate portion 104 can be made more uniform, thereby enabling good ride comfort for the occupant P.

In the present exemplary embodiment, the fixing plate portion 102 and the reaction force plate portion 104 of the reaction force plate 100 are integrally coupled together through the integral hinge 106. The plural anchor claws 112 formed on the opposite side of the reaction force plate portion 104 to the integral hinge 106 are inserted into and anchored to the plural anchor holes 114 formed in the rear flange portion 30C of the outer side frame 30. Due to making configuration in this manner, during attachment of the airbag module 54 to the outer side frame 30, the fixing plate portion 102 is fastened and fixed to the outer side frame 30 with the reaction force plate 100 opened out as illustrated in FIG. 7. Then, as illustrated in FIG. 8, the reaction force plate portion 104 to which the inner bag section 64 is anchored is rotated with respect to the fixing plate portion 102 about the integral hinge 106, and the plural anchor claws 112 are inserted into and anchored to the plural anchor holes 114. This thereby enables the reaction force plate portion 104 and the inner bag section 64 to be prevented or suppressed from getting in the way when fastening and fixing the fixing plate portion 102 to the outer side frame 30.

Moreover, the reaction force plate 100 includes the integral hinge 106, thereby enabling the reaction force plate 100 to be molded in a substantially flat plate shaped opened out state (the state illustrated in FIG. 6 and FIG. 7). The reaction force plate 100 is accordingly easier to mold, and the reaction force plate 100 is easier to store and transport, than in cases in which the reaction force plate 100 is molded with a substantially V-shaped cross-section (a cross-section profile such as that illustrated in FIG. 2, FIG. 3, and the like). Moreover, since the airbag module 54 can be made so as not to be bulky prior to attachment to the outer side frame 30, the airbag module 54 is easy to store and transport.

In the present exemplary embodiment, the plural hooking claws 116 formed to the leading end portion of the reaction force plate portion 104 are inserted into the plural hooking holes 118 formed to the leading end portion of the inner bag section 64 so as to anchor the inner bag section 64 to the reaction force plate portion 104. This thereby enables the inner bag section 64 to be anchored to the reaction force plate portion 104 using a simple configuration.

In the present exemplary embodiment, the reaction force plate 100 includes the plural ribs 120 extending out from the reaction force plate portion 104 toward the side wall portion 30A side of the outer side frame 30. The reaction force plate portion 104 is supported by the side wall portion 30A due to the ribs 120 engaging with (abutting) the side wall portion 30A. Accordingly, the reaction force plate portion 104 can be well supported by the side wall portion 30A when the reaction force plate portion 104 bears a load from the occupant P through the inflated inner bag section 64. The reaction force plate portion 104 can be prevented or suppressed from flexing toward the side wall portion 30A side under the load from the occupant P as a result, thereby enabling the occupant restraint performance of the inner bag section 64 to be further improved.

In the present exemplary embodiment, the inflator 52 is housed inside the rear bag section 74 of the side airbag main body 62, thereby enabling gas to be supplied to the side airbag main body 62 earlier than in a configuration in which the inflator 52 is housed inside the inner bag section 64. Moreover, due to making configuration in which the side airbag main body 62 is stored on the seat width direction outer side of the outer side frame 30, the side airbag main body 62 is less liable to impinge on the occupant P during deployment than in configurations in which the side airbag main body 62 is stored on the seat width direction inner side of the outer side frame 30. This thereby enables deployment performance of the side airbag main body 62 to be improved.

In the rear bag section 74 of the side airbag main body 62, at least the front portion 74F of the side airbag main body 62 is positioned further to the seat front side than the front flange portion 30B of the outer side frame 30 in the inflated and deployed state of the side airbag main body 62. The inner bag section 64 extends out from inside the front portion 74F of the rear bag section 74, past the seat front of the front flange portion 30B of the outer side frame 30, and to the seat width direction inner side of the outer side frame 30. The internal portion of the inner bag section 64 is in communication with the inside of the front portion 74F of the rear bag section 74. Accordingly, a gas supply route from inside the front portion 74F of the rear bag section 74 into the inner bag section 64 can be configured without a sharp bend at the seat front of the outer side frame 30, thereby enabling a smooth supply of gas from inside the front portion 74F of the rear bag section 74 into the inner bag section 64. This thereby enables early inflation of the inner bag section 64. Early restraint of the occupant P by the inner bag section 64 is thereby enabled.

Accordingly, the present exemplary embodiment enables both deployment performance of the side airbag main body 62 and early restraint performance of the occupant P to be satisfied. Moreover, since the occupant restraint performance is improved by the inner bag section 64, there is no need to provide the side airbag main body 62 with additional inflation thickness in the vehicle width direction in order to improve the occupant restraint performance. This thereby enables good deployment performance of the side airbag main body 62 to be secured in a narrow gap between the door trim 63 and B pillar garnish 65, and the occupant P.

Supplementary explanation follows regarding the above advantageous effect. In the present exemplary embodiment, the inner bag section 64 receives a reaction force from the reaction force plate portion 104 of the reaction force plate 100 and restrains the occupant P early, before the side airbag main body 62 receives a reaction force from the door trim 63 and the B pillar garnish 65 moving toward the vehicle width direction inside due to the impact of a side-on collision. This thereby enables the occupant P to be restrained at an earlier timing, enabling occupant restraint by the side airbag 50 to be made longer in duration. This thereby enables an occupant restraint load of the side airbag 50 to be reduced as a result, enabling a reduction in the burden on the occupant P.

Note that as a measure to improve occupant restraint performance, consideration may be given to increasing the size of the side airbag main body 62, or inflating the side airbag main body 62 to a higher pressure by increasing the output of the inflator 52. However, such measures make it difficult to secure injury reduction performance with respect to an occupant positioned in a non-standard position, this being a region where the side airbag main body 62 inflates and deploys (what is referred to as out-of-position (OOP) performance). Regarding this point, the inner bag section 64 according to the present exemplary embodiment inflates within the side section 16A, such that there is a low degree of injury with respect to an occupant in a non-standard position. Moreover, increasing the output of the inflator 52 is a measure that incurs an increase in costs due to increasing the size of the inflator 52, whereas the present exemplary embodiment enables such an increase in costs to be avoided.

In the present exemplary embodiment, in the side airbag main body 62, the rear bag section 74 that houses the inflator 52 inflates and deploys earlier, and at a higher pressure, than the front bag section 72. In the inflated and deployed state, a location of the rear bag section 74 further to the upper side than the vicinity of the waist of the occupant P is positioned further to the seat rear side than the front edge portion 16A1 of the side section 16A of the seatback 16. This thereby enables the consequences for an occupant in a non-standard position from the high pressure rear bag section 74 to be lessened.

Moreover, in the present exemplary embodiment, the inner bag section 64 formed from the base cloths 96, 98, these being separate to the base cloths 66, 68 of the side airbag main body 62, is joined to the side airbag main body 62. Accordingly, for example, the side airbag main body 62 may employ an existing side airbag that is partitioned into a front bag section and a rear bag section (what is referred to as a front-rear dual chamber side airbag) with only slight modifications (such as forming the communication port 94).

In the present exemplary embodiment, the rear bag section 74 is partitioned into the upper chamber 84, the up-down direction intermediate chamber 86, and the lower chamber 88 that are in communication with each other on the front portion 74F side. The inside of the up-down direction intermediate chamber 86 and the inside of the inner bag section 64 are in communication with each other directly, and not through the upper chamber 84 and the lower chamber 88. Accordingly, gas generated by the inflator 52 inside the up-down direction intermediate chamber 86 is supplied into the inner bag section 64 without passing through the inside of the upper chamber 84 and the inside of the lower chamber 88. This thereby enables gas to be supplied into the inner bag section 64 earlier than in cases in which the rear bag section 74 is not partitioned as described above, enabling even earlier inflation of the inner bag section 64.

In the present exemplary embodiment, the inside of the upper chamber 84 of the rear bag section 74 and the inside of the front bag section 72 are in communication with each other through the upper side inner vent hole 76, and the inside of the lower chamber 88 of the rear bag section 74 and the inside of the front bag section 72 are in communication with each other through the lower side inner vent hole 78. Gas generated by the inflator 52 inside the up-down direction intermediate chamber 86 of the rear bag section 74 is distributed into the inner bag section 64, into the upper chamber 84, and into the lower chamber 88. A portion of the gas distributed into the upper chamber 84 and into the lower chamber 88 is supplied into the front bag section 72 through the upper side inner vent hole 76 and the lower side inner vent hole 78. The gas supply route to the inside of the front bag section 72 is accordingly lengthened, thereby enabling the supply of gas into the front bag section 72 to be slowed. This enables commensurate priority to be given to supplying gas into the inner bag section 64. This thereby enables even earlier inflation of the inner bag section 64.

In the present exemplary embodiment, the inner bag section 64 is stored inside the side section 16A in a state spread out in a flat shape. This thereby enables earlier inflation of the inner bag section 64 than in cases in which, for example, the inner bag section 64 is stored inside the side section 16A in a state folded into a concertina shape.

Next, explanation follows regarding other exemplary embodiments of the present disclosure. Note that configurations and operation that are basically the same as those of the first exemplary embodiment are allocated the same reference numerals as in the first exemplary embodiment, and explanation thereof is omitted.

Second Exemplary Embodiment

Figure 10:
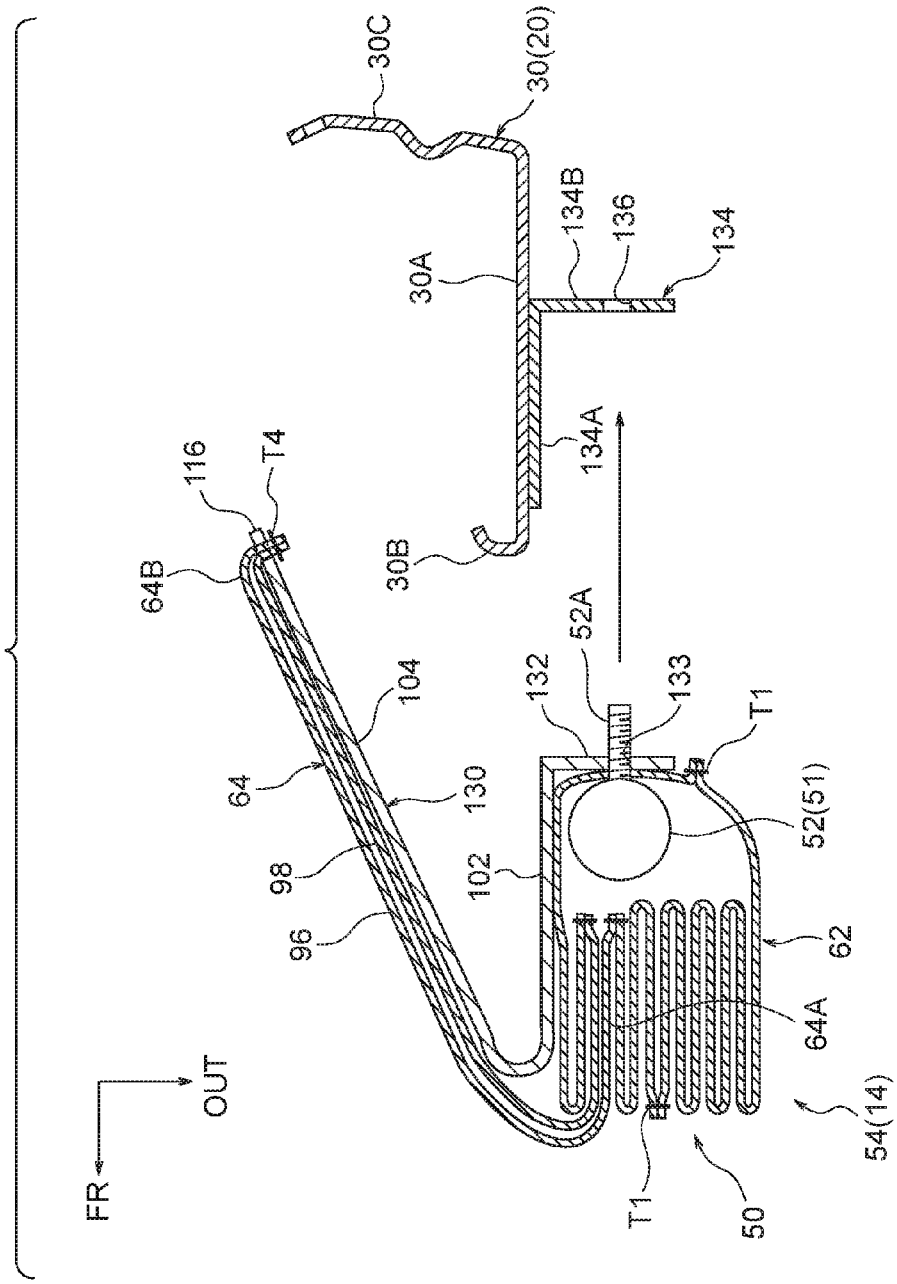
FIG. 10 is a plan view cross-section illustrating configuration of relevant portions of a side airbag device-installed vehicle seat according to a second exemplary embodiment of the present disclosure, illustrating a state prior to attachment of an airbag module including a reaction force plate to an outer side frame.

FIG. 10 is a plan view cross-section illustrating an airbag module 54 configured including a reaction force plate 130, serving as a reaction force member, in a state prior to attachment to the outer side frame 30 in a side airbag device-installed vehicle seat according to a second exemplary embodiment of the present disclosure. Note that a diffuser 53 is omitted from illustration in FIG. 10. The reaction force plate 130 is, for example, formed by bending a metal plate into a substantially V-shaped cross-section, and a reaction force plate portion 104 extends out integrally from a front end portion of a fixing plate portion 102. A main body reaction force plate portion 132 extends out integrally from a rear end portion of the fixing plate portion 102 toward the seat width direction outer side. The main body reaction force plate portion 132 is disposed at the seat rear of the side airbag main body 62, and has a dimension along the height direction of the seatback 16 set so as to be equivalent to that of the fixing plate portion 102 and the reaction force plate portion 104. The main body reaction force plate portion 132 is configured so as to apply a reaction force to the side airbag main body 62 during inflation and deployment. Note that the main body reaction force plate portion 132 may be formed longer than the fixing plate portion 102 and the reaction force plate portion 104 in the height direction of the seatback 16.

In the present exemplary embodiment, the upper and lower stud bolts 52A of the inflator 52 project out toward the rear of the seat, and are inserted through bolt insertion holes 133 formed in the main body reaction force plate portion 132. The outer side frame 30 is provided with an attachment bracket 134 corresponding to the stud bolts 52A. The attachment bracket 134 is, for example, formed by bending a metal plate into an L-shaped cross-section, and is configured by a joint portion 134A that is joined to a seat width direction outer side face of the side wall portion 30A, and an attachment portion 134B that extends from a rear end portion of the joint portion 134A toward the seat width direction outer side. The attachment portion 134B is formed with a pair of upper and lower bolt insertion holes 136, and respective nuts, not illustrated in the drawings, are screwed onto the upper and lower stud bolts 52A that have been inserted through the bolt insertion holes 136. The airbag module 54 is thereby fastened and fixed (by what is referred to as back face fastening) to the outer side frame 30. Note that in the present exemplary embodiment, the anchor claws 112, the anchor holes 114, and the ribs 120 of the first exemplary embodiment are omitted. Other configuration is similar to that of the first exemplary embodiment.

In the present exemplary embodiment, although the fixing plate portion 102 and the reaction force plate portion 104 are not coupled together by the integral hinge 106, the reaction force plate portion 104 and the inner bag section 64 do not get in the way during attachment of the airbag module 54 to the outer side frame 30. Moreover, in the present exemplary embodiment, the reaction force plate 130 including the reaction force plate portion 104 for the inner bag section 64 includes the main body reaction force plate portion 132 that applies reaction force to the side airbag main body 62 during inflation and deployment. This thereby also enables the deployment performance of the side airbag main body 62 to be improved with a simple configuration.

Third Exemplary Embodiment

Figure 11:
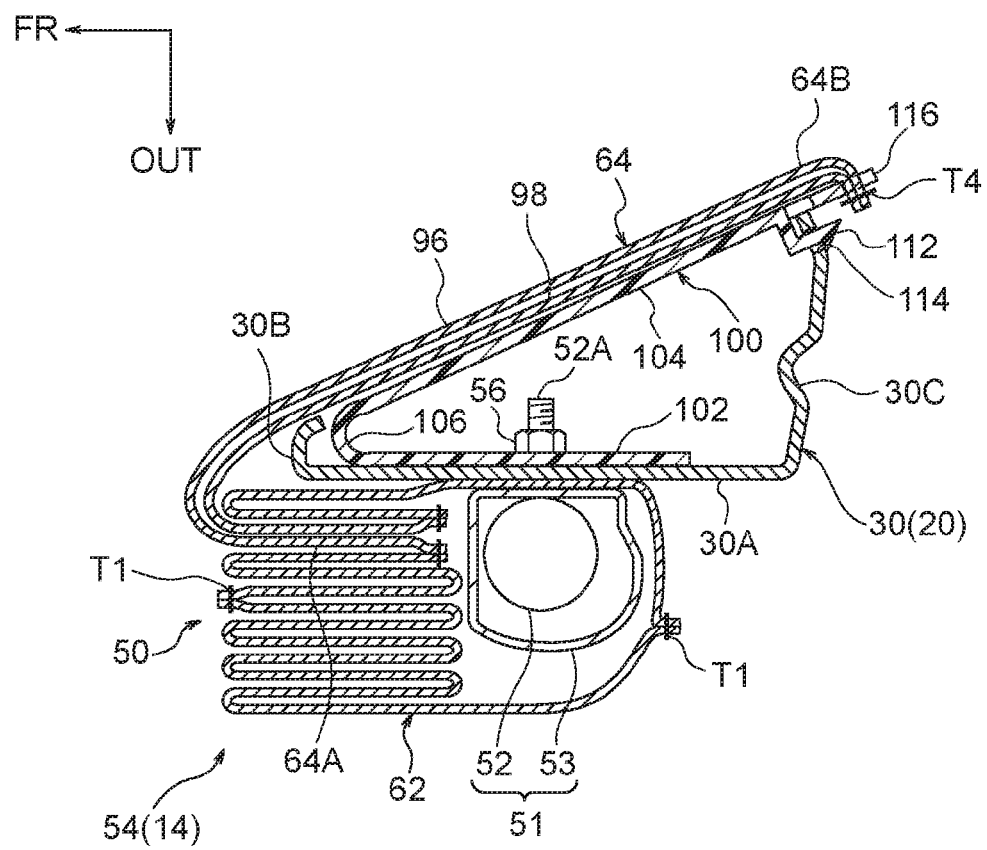
FIG. 11 is a cross-section corresponding to part of FIG. 3, illustrating configuration of relevant portions of a side airbag device-installed vehicle seat according to a third exemplary embodiment of the present disclosure.

FIG. 11 is a cross-section corresponding to part of FIG. 3, illustrating configuration of relevant portions of a side airbag device-installed vehicle seat according to a third exemplary embodiment of the present disclosure. In the present exemplary embodiment, the fixing plate portion 102 of the reaction force plate 100 is disposed on the seat width direction inner side of the outer side frame 30. Specifically, the fixing plate portion 102 is disposed between the front flange portion 30B and the rear flange portion 30C, and overlaps with a seat width direction inner side face of the side wall portion 30A. The upper and lower stud bolts 52A of the inflator 52 and the upper and lower nuts 56 are used to fasten and fix the fixing plate portion 102 to the outer side frame 30. In the present exemplary embodiment, the anti-removal washer 110 and the ribs 120 of the first exemplary embodiment are omitted. Other configurations are similar to those of the first exemplary embodiment. Accordingly, configurations similar to those to first exemplary embodiment obtain similar operation and advantageous effects to those of the first exemplary embodiment.

Note that in the third exemplary embodiment, configuration is made in which the fixing plate portion 102, serving as a fixing portion, is fastened and fixed to the outer side frame 30 using the stud bolts 52A and the nuts 56. However, there is no limitation thereto, and the shape of the fixing portion and the method for fixing the fixing plate portion 102 to the outer side frame 30 may be modified as appropriate. For example, configuration may be made in which plural column shaped fixing portions extend out from the reaction force plate portion 104 toward the side wall portion 30A side, and claw portions formed to leading ends of the plural fixing portions are inserted into and fixed to plural holes formed in the side wall portion 30A. As another example, configuration may be made in which claw shaped fixing portions respectively extending out from a base end portion (front end portion) and a leading end portion (rear end portion) of the reaction force plate portion 104 are hooked onto and fixed to the front flange portion 30B and the rear flange portion 30C. Alternatively, configuration may be made in which fixing portions extending out from the reaction force plate portion 104 are fixed to the side wall portion 30A, the front flange portion 30B, or the rear flange portion 30C of the outer side frame 30 by screw fastening or the like.

Fourth Exemplary Embodiment

FIG. 12 is a cross-section corresponding to FIG. 2, illustrating configuration of relevant portions of a side airbag device-installed vehicle seat according to a fourth exemplary embodiment of the present disclosure. In the present exemplary embodiment, the structure of a side airbag 140 differs from that of the side airbag 50 according to the first exemplary embodiment. Other configurations are basically the same as those of the first exemplary embodiment. The side airbag 140 is configured by a side airbag main body 62 and an inner bag section 64, similarly to the side airbag 50.

However, in the side airbag 140, the inner bag section 64 is integrally formed to the rear bag section 74 by extension portions 142A, 144A where base cloths 142, 144 of the rear bag section 74 are extended from the front portion 74F of the rear bag section 74. The inner bag section 64 extends (is folded) toward the side that will be on the seat width direction inner side of the rear bag section 74 in the inflated and deployed state. The front bag section 72 is formed from base cloths 146, 148 that are separate to the base cloths 142, 144 of the rear bag section 74. The front bag section 72 is joined to the front portion 74F of the rear bag section 74.

Specifically, the two base cloths 142, 144 configuring the rear bag section 74 are cut out in substantially T-shapes so as to include the extension portions 142A, 144A described above. The base cloths 142, 144 are mutually overlapped and stitched (joined) together at a stitching portion T7 at outer peripheral edge portions thereof, thereby forming the rear bag section 74 and the inner bag section 64 as an integral bag body.

The front bag section 72 is formed in an elongated bag shape by mutually overlapping and partially stitching (joining) together outer peripheral edge portions of the two base cloths 146, 148, cut out in substantially rectangular shapes, at a stitching portion T8. The stitching portion T8 is absent from one long side edge portion (a rear edge portion) of the front bag section 72. An opening 150 is accordingly formed at the rear edge portion of the front bag section 72. The rear edge portion of the front bag section 72 is then stitched (joined) to the front portion 74F of the rear bag section 74 at a stitching portion T9.

The base cloth 144 of the rear bag section 74 configures a tether portion (partitioning cloth portion) 152 at a location configuring the front portion 74F of the rear bag section 74. The inside of the front bag section 72 and the inside of the rear bag section 74 are partitioned by the tether portion 152. An upper side inner vent hole 76 (not illustrated in FIG. 12) is formed at an upper end portion of the tether portion 152, and a lower side inner vent hole 78 (not illustrated in FIG. 12) is formed at a lower end portion of the tether portion 152. Other configurations are similar to those of the first exemplary embodiment.

In the fourth exemplary embodiment, it is not possible manufacture the side airbag 140 employing an existing front-rear dual chamber side airbag. However, the same basic operation and advantageous effects to those of the first exemplary embodiment can be obtained in other respects. The fourth exemplary embodiment enables gas inside the rear bag section 74 to be supplied into the inner hag section. 64 more smoothly than in the first exemplary embodiment. This thereby enables the inner bag section 64 to be inflated earlier than in the first exemplary embodiment.

Note that in the first, second, and fourth exemplary embodiments, configuration is made in which the fixing plate portion 102 and the reaction force plate portion 104 are coupled together at the seat front side of the outer side frame 30. However, the present disclosure is not limited thereto, and configuration may be made in which the fixing plate portion 102 and the reaction force plate portion 104 are coupled together at the seat front side of the outer side frame 30.

In the exemplary embodiments described above, configuration is made in which the reaction force plate portion 104 is inclined toward the seat width direction inner side on progression toward the seat rear side. However, the present disclosure is not limited thereto, and configuration may be made in which the reaction force plate portion 104 extends along the seat front-rear direction.

In each of the exemplary embodiments described above, configuration is made in which the rear bag section 74 is partitioned into the upper chamber 84, the up-down direction intermediate chamber 86, and the lower chamber 88 by the upper and lower partitioning portions 80, 82. However, the present disclosure is not limited thereto, and configuration may be made in which the upper and lower partitioning portions 80, 82 are omitted.

In each of the exemplary embodiments described above, configuration is made in which inner vent holes are configured by the upper side inner vent hole 76 formed at the upper end portion of the tether 70 or the tether portion 152, and the lower side inner vent hole 78 formed at the lower end portion of the tether 70 or the tether portion 152. However, the present disclosure is not limited thereto. The number of, and positions for forming, the inner vent holes may be modified as appropriate.

In each of the exemplary embodiments described above, configuration is made in which the outer side frame 30 provided inside the side section 16A on the vehicle width direction outside of the seatback 16 configures a "side frame" according to the present disclosure. However, there is no limitation thereto. The "side frame" according to the present disclosure may also be configured by the inner side frame provided inside the side section on the vehicle width direction inside of the seatback 16.

Various other modifications may be implemented within a range not departing from the spirit of the present disclosure. Obviously, the scope of rights encompassed by the present disclosure is not limited to the exemplary embodiments described above.

What is claimed is:

1. A side airbag device-installed vehicle seat comprising:
    a seat frame that is configured including a side frame provided inside a side section of a seatback, and that is covered by a seat pad;
    a side airbag main body that is stored inside the side section at a seat width direction outer side of the side frame, that is fixed to the side frame using a gas generator housed inside the side airbag main body, and that receives a supply of gas from the gas generator and inflates and deploys toward a seat front side of the side section;
    an inner bag section that extends out from the side airbag main body, past a seat front of the side frame, and to a seat width direction inner side of the side frame, and that inflates within the side section when an internal portion of the inner bag section in communication with an inside of the side airbag main body is supplied with gas from the gas generator; and
    a reaction force member including a fixing portion that is fixed to the side frame, and a reaction force application portion that is interposed between the inner bag section and the side frame at the seat width direction inner side of the side frame and that applies reaction force to the inner bag section during inflation, the inner bag section being anchored to the reaction force application portion.

2. The side airbag device-installed vehicle seat of claim 1, wherein the fixing portion is disposed at the seat width direction outer side of the side frame, and is fixed to the side frame using the gas generator.

3. The side airbag device-installed vehicle seat of claim 2, wherein the fixing portion and the reaction force application portion are coupled together at the seat front side of the side frame.

4. The side airbag device-installed vehicle seat of claim 1, wherein the reaction force application portion is inclined toward the seat width direction inner side on progression toward a seat rear side.

5. The side airbag device-installed vehicle seat of claim 1, wherein the fixing portion and the reaction force application portion are coupled together through an integral hinge, and an end portion of the reaction force application portion on an opposite side from the integral hinge is anchored to the side frame.

6. The side airbag device-installed vehicle seat of claim 1, wherein the reaction force member includes a main body reaction force application portion that is disposed at a seat rear of the side airbag main body and that applies reaction force to the side airbag main body during inflation and deployment.

7. The side airbag device-installed vehicle seat of claim 1, wherein the side frame includes:
    a side wall portion extending along a seat front-rear direction in a plan view cross-section of the seatback;
    a front flange portion extending from a front end of the side wall portion toward the seat width direction inner side; and
    a rear flange portion extending from a rear end of the side wall portion toward the seat width direction inner side, and
    respective leading end portions of the front flange portion and the rear flange portion are covered from the seat width direction inner side by the reaction force application portion.

8. The side airbag device-installed vehicle seat of claim 1, wherein a plurality of hooking claws formed at a leading end portion of the reaction force application portion are inserted into a plurality of hooking holes formed at a leading end portion of the inner bag section to anchor the inner bag section to the reaction force application portion.

9. The side airbag device-installed vehicle seat of claim 1, wherein the side frame includes:
    a side wall portion extending along a seat front-rear direction in a plan view cross-section of the seatback;
    a front flange portion extending from a front end of the side wall portion toward the seat width direction inner side; and
    a rear flange portion extending from a rear end of the side wall portion toward the seat width direction inner side, and
    a plurality of ribs extending out from the reaction force application portion toward the side wall portion side engage with the side wall portion such that the reaction force application portion is supported by the side wall portion.

10. The side airbag device-installed vehicle seat of claim 1, wherein:
    the side airbag main body is partitioned into a front bag section and a rear bag section by an internally provided tether;
    the gas generator is housed inside the rear bag section;
    a front portion of the rear bag section is positioned further to the seat front side than the side frame at least in an inflated and deployed state of the side airbag main body; and
    the inner bag section extends out from inside the front portion of the rear bag section, past the seat front of the side frame, and to the seat width direction inner side of the side frame, and an internal portion of the inner bag section is in communication with the inside of the front portion of the rear bag section.

11. The side airbag device-installed vehicle seat of claim 1, wherein the inner bag section is formed from a separate base cloth from a base cloth of the side airbag main body, and the inner bag section is joined to the side airbag main body.

12. The side airbag device-installed vehicle seat of claim 10, wherein:
    the rear bag section is partitioned into an upper chamber, an up-down direction intermediate chamber, and a lower chamber that are in communication with each other at the front portion side;
    the gas generator is housed inside the up-down direction intermediate chamber; and
    the up-down direction intermediate chamber and the inside of the inner bag section are in communication with each other directly, and not through an inside of the upper chamber or an inside of the lower chamber.

13. The side airbag device-installed vehicle seat of claim 12, wherein:
    the inside of the upper chamber and an inside of the front bag section are in communication with each other through an upper side inner vent hole, and the inside of the lower chamber and the inside of the front bag section are in communication with each other through a lower side inner vent hole; and gas generated by the gas generator inside the up-down direction intermediate chamber is distributed into the inner bag section and into the upper chamber and the lower chamber, and a portion of the gas distributed into the upper chamber and into the lower chamber is supplied into the front bag section through the upper side inner vent hole and the lower side inner vent hole respectively.

14. The side airbag device-installed vehicle seat of claim 1, wherein the inner bag section is stored inside the side section in a state spread out in a flat shape.

* * * * *